United States Patent
Yasui et al.

(10) Patent No.: US 8,328,266 B2
(45) Date of Patent: Dec. 11, 2012

(54) PICK-UP STYLE UTILITY VEHICLE WITH EXPANDABLE CARGO BED

(75) Inventors: Hidekazu Yasui, Kobe (JP); Hirokazu Morira, Kakogawa (JP); Kenji Oda, Akashi (JP); Takao Kawabata, Kobe (JP); Masaki Tanaka, Hirakata (JP); Eiji Ihara, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 232 days.

(21) Appl. No.: 12/648,596

(22) Filed: Dec. 29, 2009

(65) Prior Publication Data

US 2011/0156420 A1 Jun. 30, 2011

(51) Int. Cl.
*B62D 25/00* (2006.01)
(52) U.S. Cl. ............... 296/65.01; 296/26.09; 296/65.05; 296/186.4; 296/183.1
(58) Field of Classification Search ............... 296/65.01, 296/65.05, 26.1, 65.09, 186.4, 26.08, 26.09, 296/186.3, 186.5, 183.1
See application file for complete search history.

(56) References Cited

U.S. PATENT DOCUMENTS

| | | | |
|---|---|---|---|
| 3,740,014 A * | 6/1973 | Swenson et al. | 248/608 |
| 6,905,159 B1 | 6/2005 | Saito et al. | |
| 6,994,388 B2 | 2/2006 | Saito et al. | |
| 7,249,798 B2 | 7/2007 | Saito et al. | |

FOREIGN PATENT DOCUMENTS

JP 09002114 A * 1/1997

* cited by examiner

*Primary Examiner* — Glenn Dayoan
*Assistant Examiner* — Melissa A Black
(74) *Attorney, Agent, or Firm* — Wenderoth, Lind & Ponack, LLP

(57) ABSTRACT

A pick-up style utility vehicle has a front seat, a rear seat, and a cargo bed. The cargo bed is expandable forward and has a screen shield for partitioning at a front end thereof. The rear seat has a seat bottom for the rear seat detachably attached to a rear seat attaching portion provided on a vehicle body. The screen shield has a seat holding portion to which the seat bottom, detached from the rear seat attaching portion, is attachable.

1 Claim, 23 Drawing Sheets

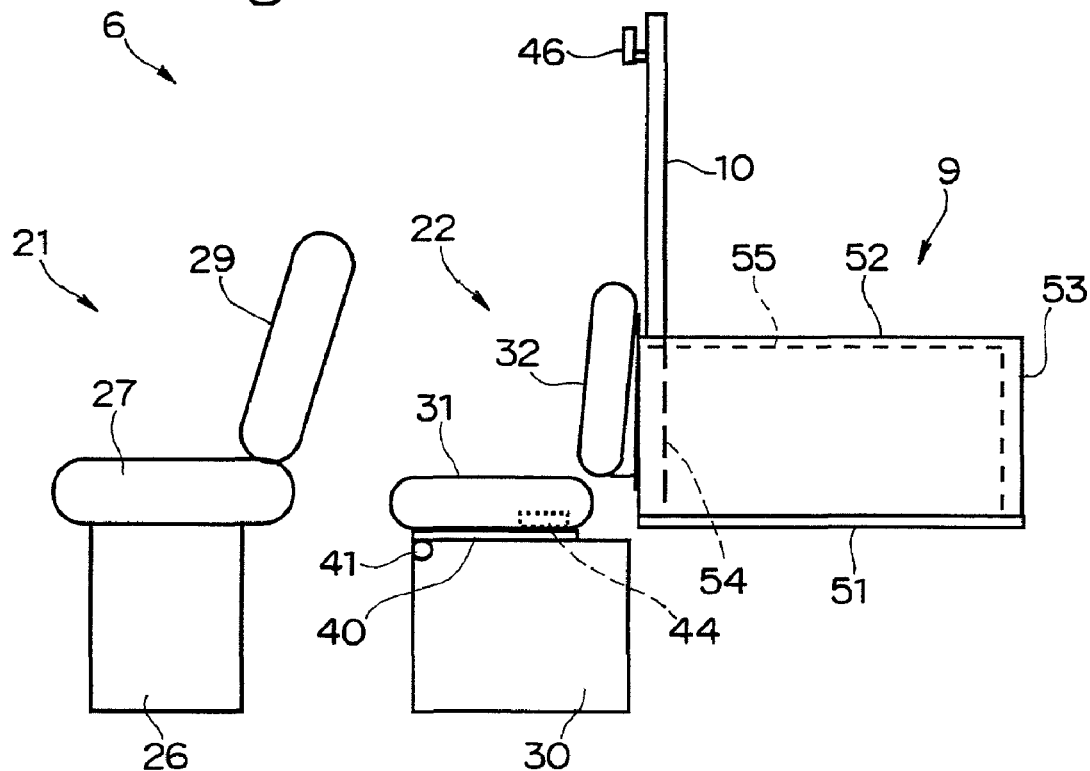
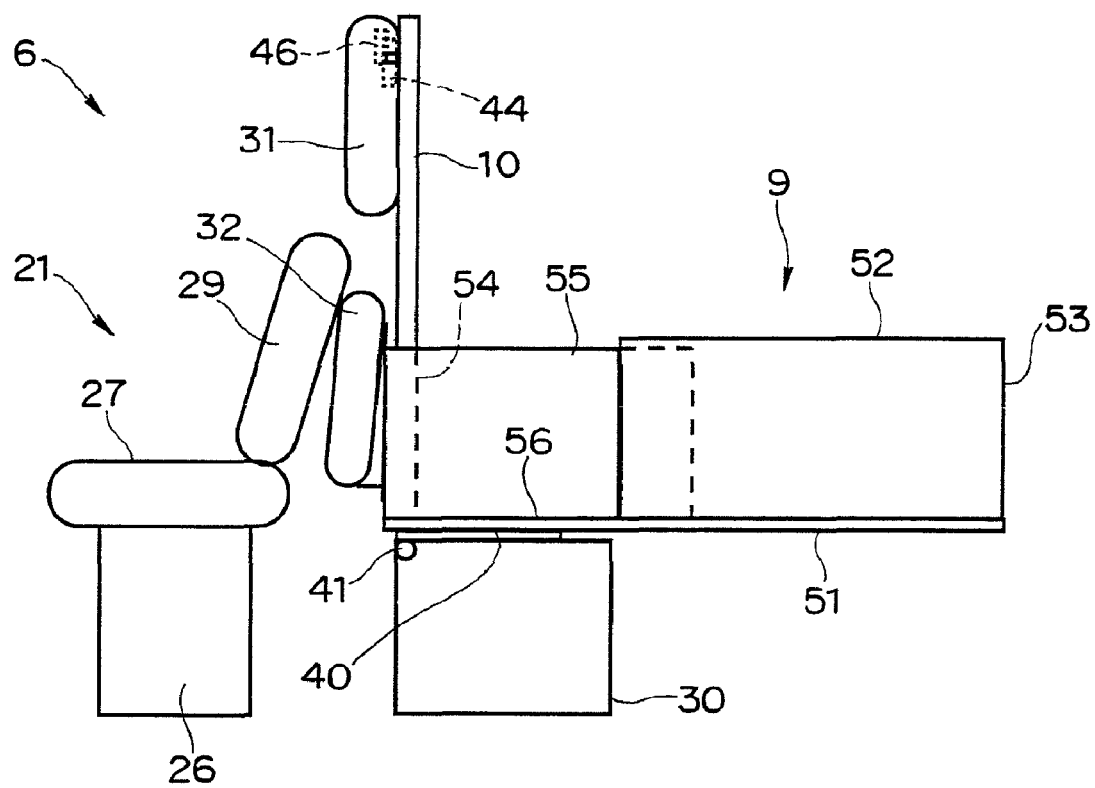

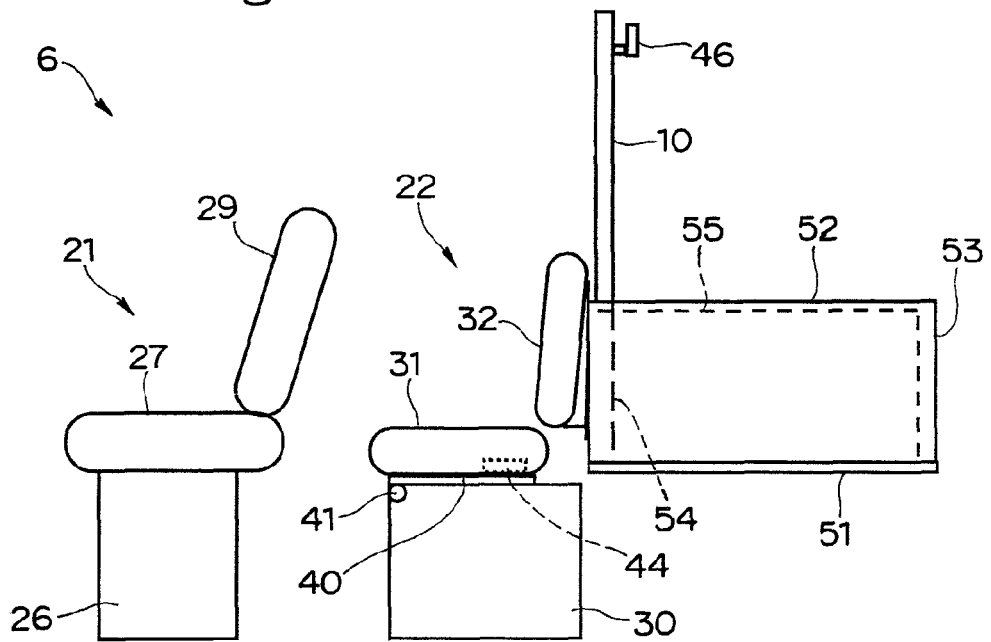
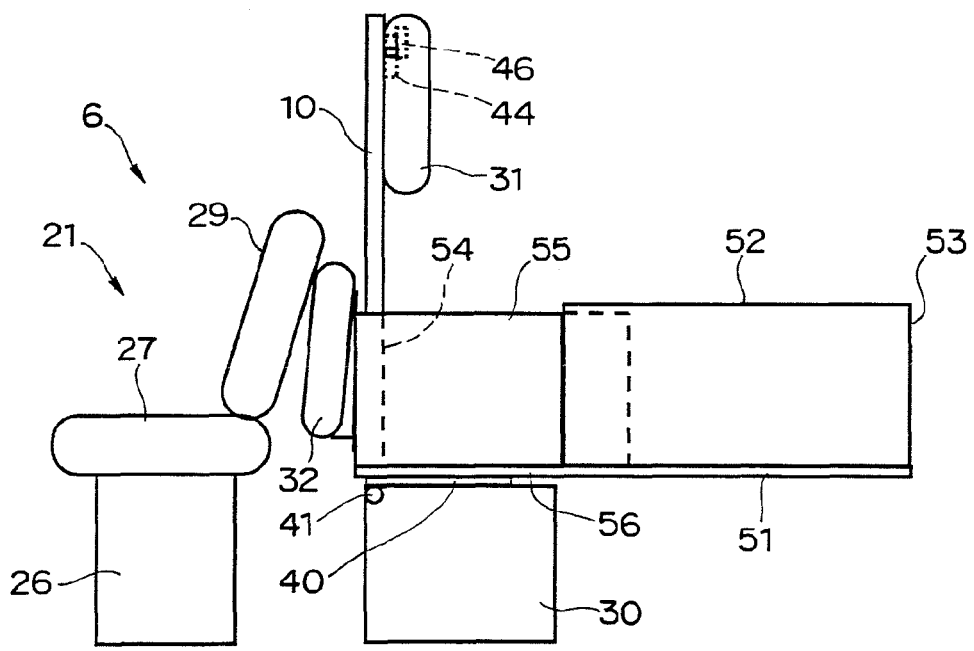

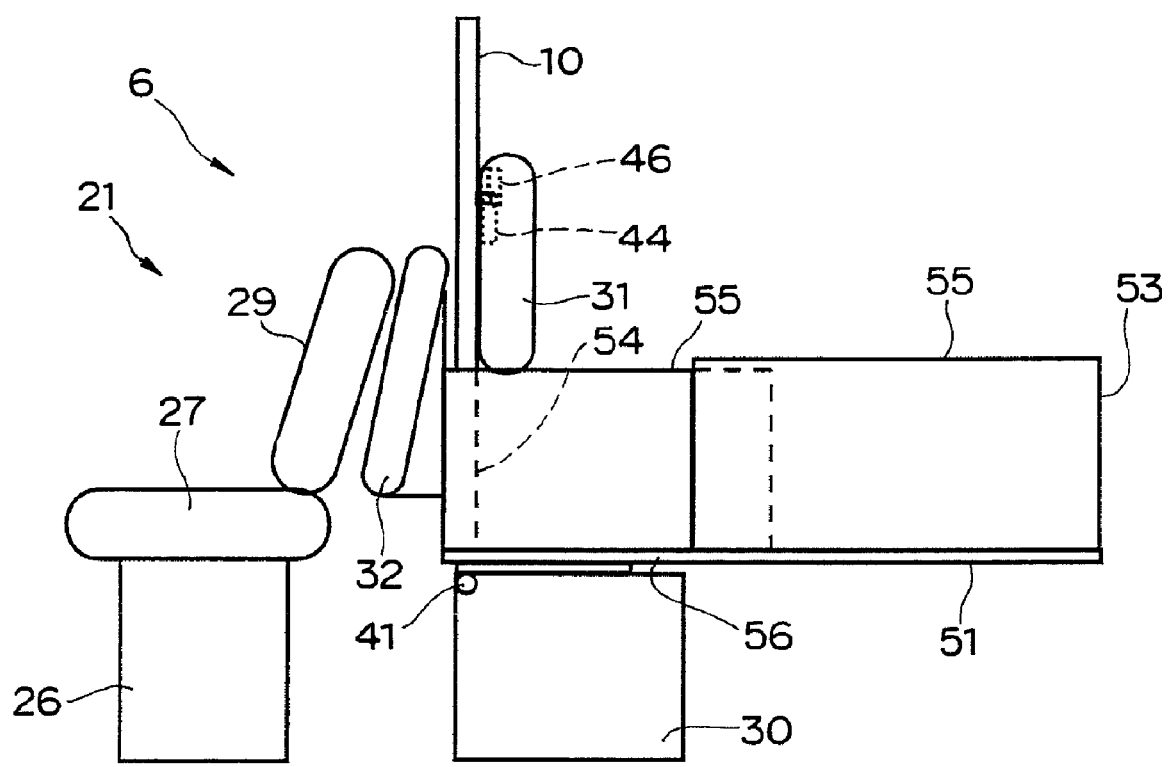

PICK-UP STYLE UTILITY VEHICLE WITH EXPANDABLE CARGO BED

BACKGROUND OF THE INVENTION

1. Field of the Invention

The present invention relates to a pick-up style utility vehicle in which a cargo bed can be expanded in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement on golf courses, golf course maintenance, and the like.

The present applicants have formerly developed inventions relating to the pick-up style utility vehicle with a cargo bed whose area or capacity can be expanded. U.S. patent have been obtained, and are, for example, U.S. Pat. Nos. 6,905, 159, 6,994,388, and 7,249,798.

FIG. 36 shows the pick-up style utility vehicle described in the above documents in a 4 passengers transformation. The pick-up style utility vehicle has a bench-shaped front seat 321 including a driver's seat, a bench-shaped rear seat 322, and a cargo bed 309 in this order from the front of the vehicle. The front seat 321 has a seat bottom 327 and a backrest 329. The rear seat 322 has a seat bottom 331 and a backrest 332. The seat bottom 331 of the rear seat 322 is fixed to a seat attaching plate 340. The seat attaching plate 340 is rotatably supported via a hinge 341 at the front upper end of a box 330 housing an engine. A screen shield 310 for partitioning is provided on a front panel 354 of the cargo bed 309. A cabin frame 307 surrounding a riding space is provided.

FIG. 37 shows the state of the pick-up style utility vehicle in a 2 passengers transformation. Regarding the rear seat 322, the backrest 332 is overlapped with the seat bottom 331, and the backrest 332 and the seat bottom 331 are rotated about the hinge 341 forward so as to be in an erected state. The cargo bed 309 is extended forward into a rear riding space. The extending method of the cargo bed is described in the publications in detail.

However, as shown in FIG. 37, when the seat bottom 331 and the backrest 332 in a folded state are retracted in front of the cargo bed 309, the forward extended distance of the cargo bed 9 is limited. Therefore, the cargo bed 309 cannot be sufficiently expanded.

SUMMARY OF THE INVENTION

The present invention has been made in view of the above problems and an object of the present invention is to provide a pick-up style utility vehicle which can efficiently set a riding space and a cargo bed space according to the number of passengers and can sufficiently expand a cargo bed.

A first aspect of the invention provides a pick-up style utility vehicle having a front seat, a rear seat, and a cargo bed. The cargo bed is expandable forward and has a screen shield for partitioning at a front end thereof, the rear seat has a seat bottom for the rear seat detachably attached to a rear seat attaching portion provided on a vehicle body, and the screen shield has a seat holding portion to which the seat bottom, when detached from the rear seat attaching portion, is attachable.

According to the first aspect of the invention, the seat holding portion can be provided on either of the front surface and the rear surface of the screen shield. In addition, the installation height of the seat holding portion can be arbitrarily set.

With the above configuration of the first aspect of the invention, when the cargo bed is expanded forward, the seat bottom for the rear seat is moved to the place in which it does not obstruct the expansion of the cargo bed. Therefore, the front end of the cargo bed can be located as close to a backrest of the front seat as possible so that the loading space of the cargo bed can be largely expanded.

In addition, the seat bottom for the rear seat is once detached from and is then attached to the screen shield. Therefore, no complicated devices for retracting the seat bottom are necessary so that the pick-up style utility vehicle can be provided at low cost.

In the first aspect of the invention, the seat bottom for the rear seat can be of a type divided to the left and right (independent type). Accordingly, as compared with the bench-shaped seat, an operator need not lift a heavy object, so that the replacing operation is easy.

A second aspect of the invention provides a pick-up style utility vehicle having a front seat, a rear seat, and a cargo bed. The cargo bed is expandable forward and has a screen shield for partitioning at a front end thereof, the rear seat has a seat bottom for the rear seat detachably attached to a rear seat attaching portion provided on a vehicle body, and a seat holding portion which can retract the seat bottom detached from the rear seat attaching portion is provided in a rear leg space behind the front seat.

With the above configuration of the second aspect of the invention, as in the first aspect of the invention, when the cargo bed is expanded forward, the seat bottom for the rear seat is moved to a place in which it does not obstruct the expansion of the cargo bed. Therefore, the front end of the cargo bed can be close to a backrest of the front seat so that the loading area of the cargo bed can be largely expanded.

A third aspect of the invention provides a pick-up style utility vehicle having a front seat, a rear seat, and a cargo bed. The cargo bed is expandable forward and has a screen shield for partitioning at a front end thereof, the rear seat has a seat bottom for the rear seat detachably attached to a rear seat attaching portion provided on a vehicle body, and a seat holding portion which can hold the seat bottom, when detached from the rear seat attaching portion, is provided on the upper side of a backrest of the front seat.

With the above configuration of the third aspect of the invention, as in the first aspect of the invention, when the cargo bed is expanded forward, the seat bottom for the rear seat is moved to a place in which it does not obstruct the expansion of the cargo bed. Therefore, the front end of the cargo bed can be close to a backrest of the front seat so that the loading area of the cargo bed can be largely expanded.

In the third aspect of the invention, the seat bottom for the rear seat can be of a type that is divided to the left and right (independent type). Accordingly, as compared with the bench-shaped seat, the replacing operation by an operator is easier and the view of the rear side as seen from the driver's seat can be secured.

A fourth aspect of the invention provides a pick-up style utility vehicle having a front seat, a rear seat, and a cargo bed. The cargo bed is expandable forward and has a screen shield for partitioning at a front end thereof, the front seat has a backrest which can be divided into an upper portion and a lower portion, and one of the upper portion and the lower portion of the backrest is position changeable between a first position in which the portion is used as the backrest and a second position in which the portion is used as a seat bottom of the rear seat.

In the fourth aspect of the invention, preferably, a pair of doors covering a rear leg space behind the front seat from both sides in a vehicle width direction are provided, and the upper portions of the doors are used as expandable side panels of the cargo bed expanded forward.

With the above configuration of the fourth aspect of the invention, when the cargo bed is expanded, the seat bottom for the rear seat is retracted on the upper side of the backrest of the front seat. Therefore, the front end of the cargo bed can be close to the backrest of the front seat so that the loading area of the cargo bed can be largely expanded.

In addition, the doors covering the left and right sides of the rear leg space are provided. Therefore, in the 4 passengers transformation, the doors protect passengers. In the 2 passengers transformation, the doors can be used as side panels of the expanded cargo bed. Further, the doors function as the side panels for preventing a load loaded into the rear leg space from being dropped.

A fifth aspect of the invention provides a pick-up style utility vehicle having a front seat, a rear seat, and a cargo bed. The rear seat is formed of a windable net or cloth, a winding portion which can wind the rear seat and a suspending mechanism which can suspend the end of the rear seat are provided on the upper portion of a protection frame portion covering a riding space and a load loading space. Also, the rear seat is changeable between a retracted state in which the rear seat is wound by the winding portion and a used state in which the rear seat is pulled down from the winding portion so as to be extended rearward and is suspended by the suspending portion near the rear end of the cargo bed.

With the above configuration of the fifth aspect of the invention, the seatable rear seat can be easily installed on the cargo bed only by pulling the rear seat out of the winding portion. In addition, the rear seat is wound by the winding portion so that the rear seat can be compactly retracted in the place in which it does not obstruct the expansion of the cargo bed. Therefore, the cargo bed can be widely used.

A sixth aspect of the invention provides a pick-up style utility vehicle having a front seat, a rear seat, and a cargo bed. The cargo bed is expandable forward and has a screen shield for partitioning at a front end thereof, and the rear seat has a backrest which can be divided into a front portion and a rear portion and is changeable between a used state in which the front portion and the rear portion are overlapped with each other so as to be erected in the rear portion of the rear seat and an unused state in which the front portion is located in front of the seat bottom so as to be abutted onto a backrest of the front seat and the rear portion is fallen on the upper surface of the seat bottom.

With the above configuration of the sixth aspect of the invention, when the cargo bed is expanded, the front portion of the backrest of the rear seat is moved forward to fall the rear portion thereof so that the cargo bed can be expanded. Therefore, the changing operation is easy and the rear portion can be used as a bottom plate of the expanded cargo bed.

A seventh aspect of the invention provides a pick-up style utility vehicle having a front seat, a rear seat, and a cargo bed. The cargo bed is expandable forward and has a screen shield for partitioning at a front end thereof, the rear seat is attached to a sheet attaching plate by a bolt, the seat attaching plate is rotatably supported by a seat attaching base between a fallen position and an erected position about a rotational shaft in a vehicle width direction and has at least two bolt insertion hole rows which have a plurality of bolt insertion holes arranged so as to be spaced in a front-rear direction and are spaced in a vehicle width direction. The bottom surface of the seat bottom has female screw holes in respective positions in a vehicle width direction corresponding to each of the bolt insertion hole rows of the seat attaching plate, and a plurality of bolts are selectively inserted through each of the bolt insertion hole rows of the seat attaching plate so as to be screwed into the female screw holes of the seat bottom of the rear seat so that the seat bottom is fixed to the seat attaching plate so as to be position changeable forward and rearward.

In the seventh aspect of the invention, preferably, the respective bolt insertion holes of one of the pairs of bolt insertion hole rows formed in the seat attaching plate communicate with each other via a guide groove extended forward and rearward.

With the above configuration of the seventh aspect of the invention, the position of the rear seat in a front-rear direction is changed so that the area of the cargo bed can be easily expanded. In addition, in the case where the respective bolt insertion holes of one of the pairs of bolt insertion hole rows formed in the seat attaching plate communicate with each other via the guide groove extended forward and rearward, when the rear seat is position changed, the bolts are unscrewed from the other bolt insertion hole row and the bolts of the one bolt insertion hole row are moved to the guide groove so that the position of the rear seat can be changed without unscrewing the bolts from the one bolt insertion hole row.

An eighth aspect of the invention provides a pick-up style utility vehicle having a front seat, a rear seat, and a cargo bed. The cargo bed is expandable forward and has a screen shield for partitioning at a front end thereof, the rear seat is attached to a seat attaching plate, the seat attaching plate is rotatably supported by a vehicle body between a fallen position and an erected position about a rotational shaft in a vehicle width direction and has a pair of toggle clamps so as to be spaced in a vehicle width direction. The bottom surface of the seat bottom has at least two hook portion rows which have a plurality of hook portions arranged so as to be spaced in a front-rear direction and are spaced in a vehicle width direction, and a ring portion of each of the toggle clamps selectively engages the hook portions of each of the hook portion rows to lock operating the toggle clamp so that the seat bottom is fixed to the seat attaching plate so as to be position changeable forward and rearward.

With the above configuration of the eighth aspect of the invention, as in the seventh aspect of the invention, the position of the rear seat in a front-rear direction is changed so that the area of the cargo bed can be easily expanded. In addition, the rear seat can be easily attached and detached by the lock releasing and the lock operation of the toggle clamps.

BRIEF DESCRIPTION OF THE DRAWINGS

FIG. 2 is a left side view of the pick-up style utility vehicle of FIG. 1 in 4 passengers transformation;

FIG. 3 is a left side view of the pick-up style utility vehicle of FIG. 1 in the 2 passengers transformation;

FIG. 4 is a left side view of a pick-up style utility vehicle according to a second embodiment of the present invention in the 4 passengers transformation;

FIG. 5 is a left side view of the pick-up style utility vehicle of FIG. 4 in the 2 passengers transformation;

FIG. 6 is a left side view of a pick-up style utility vehicle according to a third embodiment of the present invention in the 2 passengers transformation;

DETAILED DESCRIPTION OF THE PREFERRED EMBODIMENTS

First Embodiment of the Present Invention

Figure 1:
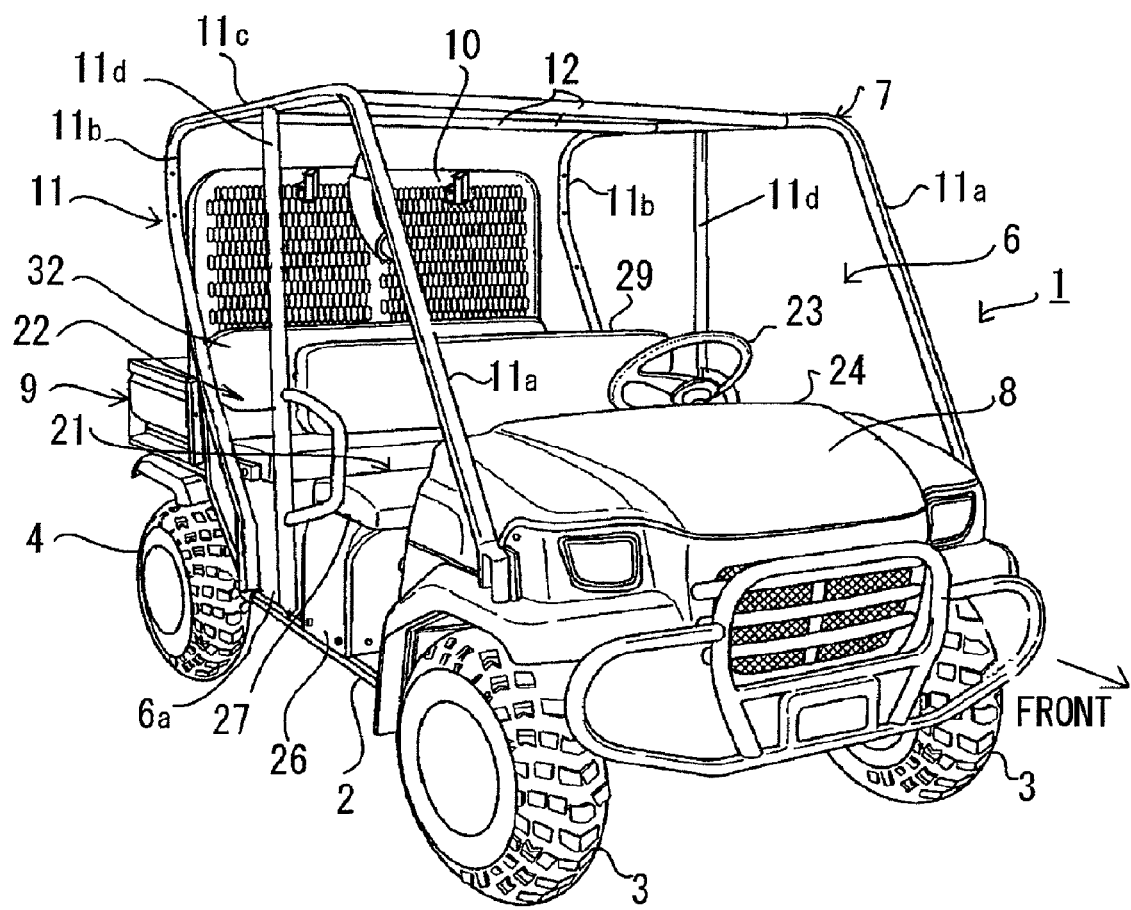
FIG. 1 is a perspective view of a pick-up style utility vehicle according to a first embodiment of the present invention.

FIGS. 1 to 3 show a first embodiment of the present invention, which will be described with reference to these drawings.

FIG. 1 is a perspective view of a pick-up style utility vehicle. For convenience of the description, the right and left seen from a driver riding in the vehicle will be described as the right and left of the vehicle. A pick-up style utility vehicle 1 has a vehicle body 2 supported by a pair of left and right front wheels 3 and a pair of left and right rear wheels 4. A cabin frame 7 configuring a cabin 6 as a riding space is provided in an intermediate portion on the vehicle body 2 in a front-rear direction. A hood (bonnet) 8 is provided in front of the cabin frame 7. A cargo bed 9 is provided behind the cabin frame 7. A screen shield 10 partitioning the cargo bed 9 and the riding space is provided at the front end of the cargo bed 9.

The cabin frame 7 has a pair of left and right side frame members 11 formed in a U-shape and made of metal pipes, and cross frame members 12 made of a plurality of metal pipes coupling the side frame members 11. Each of the side frame members 11 has a front side portion 11a extended rearward and upward from near the left or right side portion of the hood 8, a rear side portion 11b extended substantially upward from the left or right side portion at the rear end of the cabin 6, an upper side portion 11c integrally coupling the upper end of the front side portion 11a and the upper end of the rear side portion 11b and extended forward and rearward, and an intermediate vertical portion 11d coupling the intermediate portion of the upper side portion 11c in a front-rear direction and a floor surface 6a.

A bench-shaped front seat 21 is installed in the front half portion of the cabin 6. A detachable bench-shaped rear seat 22 is installed in the rear half portion of the cabin 6. A dashboard (operating portion) 24 having a steering wheel 23 and the like is provided at the front end of the cabin 6. The front seat 21 and the rear seat 22 which are of a type divided to the left and right can also be installed.

FIG. 2 is a left side view of the pick-up style utility vehicle in the 4 passengers transformation when the cargo bed 9 is not expanded. The front seat 21 has a seat bottom 27 provided on the upper end face of a seat leg 26, and a backrest 29. The rear seat 22 has a seat bottom 31 arranged on the upper side of a box (serving as a seat base) 30 housing an engine (not shown), and a backrest 32.

The seat bottom 31 of the rear seat 22 is detachably fixed to a rear seat attaching plate (rear seat attaching portion) 40 by a bolt. A concave portion 44 for engaging a hook is formed in the lower surface (back surface) of the seat bottom 31. The front end of the rear seat attaching plate 40 is rotatably supported at the front upper end of the box 30 via a hinge 41. The seat bottom 31 is attached to and detached from the seat attaching plate 40 in the state in which the seat attaching plate 40 is erected. The backrest 32 is fixed to the front surface of a front panel (the lower panel of the screen shield 10) 54 of the cargo bed 9.

The cargo bed 9 has a bottom plate 51 extendable forward, a pair of stationary side panels 52 provided substantially perpendicular to the bottom plate 51 along the left and right ends of the bottom plate 51, and an openable and closeable gate type rear panel 53 provided at the rear end of the bottom plate 51. The front panel 54, and a pair of expandable side panels 55 are movable forward in the stationary side panels 52. The front panel 54 is coupled to the front ends of the expandable side panels 55 and is movable forward together with the expandable side panels 55. In other words, the cargo bed 9 is expandable into a rear riding space in front of the cargo bed 9.

The screen shield 10 is made of a metal net or a porous plate so that a driver can see the rear side through the screen shield 10. A pair of seat holding portions 46, that are engageable with the concave portions 44 of the seat bottom 31, the seat holding portions are provided at the upper ends of the front surface of the screen shield 10. The seat holding portions 46 are L-shaped hooks.

FIG. 3 is a left side view of the pick-up style utility vehicle in the 2 passengers transformation when the cargo bed 9 is expanded forward. The seat bottom 31, detached from the seat attaching plate 40, is held in the upper portion of the front surface of the screen shield 10 by engaging the concave portion 44 with the seat holding portion (hook) 46 of the screen shield 10. On the other hand, the backrest 32 is moved forward together with the front panel 54 of the cargo bed 9 and is substantially contacted with the backrest 29 of the front seat 21.

The changing operation from the 4 passengers transformation to the 2 passengers transformation will be simply described. In FIG. 2, the seat bottom 31 of the rear seat 22 is rotated about the hinge 41 together with the seat attaching plate 40, is erected, is detached from the seat attaching plate 40, and is hooked onto the seat holding portion 46 of the screen shield 10.

In FIG. 3, the bottom plate 51 is expanded forward, the upper surface of the seat attaching plate 40 is covered by a forward expandable portion 56 of the bottom plate 51, the screen shield 10, the front panel 54, and the left and right expandable side panels 55 are moved forward, and the backrest 32 of the rear seat 22 is substantially contacted with the backrest 29 of the front seat 21.

According to the embodiment, when the 4 passengers transformation is changed to the 2 passengers transformation to expand the cargo bed 9 forward, the seat bottom 31 of the rear seat 22 is retracted in the position in which it does not obstruct the forward expansion of the cargo bed 9 so that the expanded area of the cargo bed 9 can be larger than the prior art.

Second Embodiment

FIGS. 4 and 5 show a second embodiment of the present invention. FIG. 4 is a left side view of the 4 passengers transformation when the cargo bed 9 is not expanded. FIG. 5 is a left side view of the 2 passengers transformation when the cargo bed 9 is expanded forward. The second embodiment is different from the first embodiment in that the seat holding portion (hook) 46 for holding the seat bottom 31 of the rear seat 22 is provided at the upper end of the rear surface of the screen shield 10. The configurations of the front seat 21, the rear seat 22, and the cargo bed 9 are the same as those of the first embodiment. Like components are indicated by like reference numerals.

Third Embodiment

FIG. 6 shows a third embodiment of the present invention. The third embodiment is different from the first embodiment in that the seat holding portion (hook) 46 for holding the seat bottom 31 is provided on the rear surface of the screen shield 10 and that the seat holding portion 46 is installed at the height of the lower portion of the screen shield 10. Other configurations are the same as those of the first embodiment. Like components are indicated by like reference numerals.

Fourth Embodiment

Figure 7:
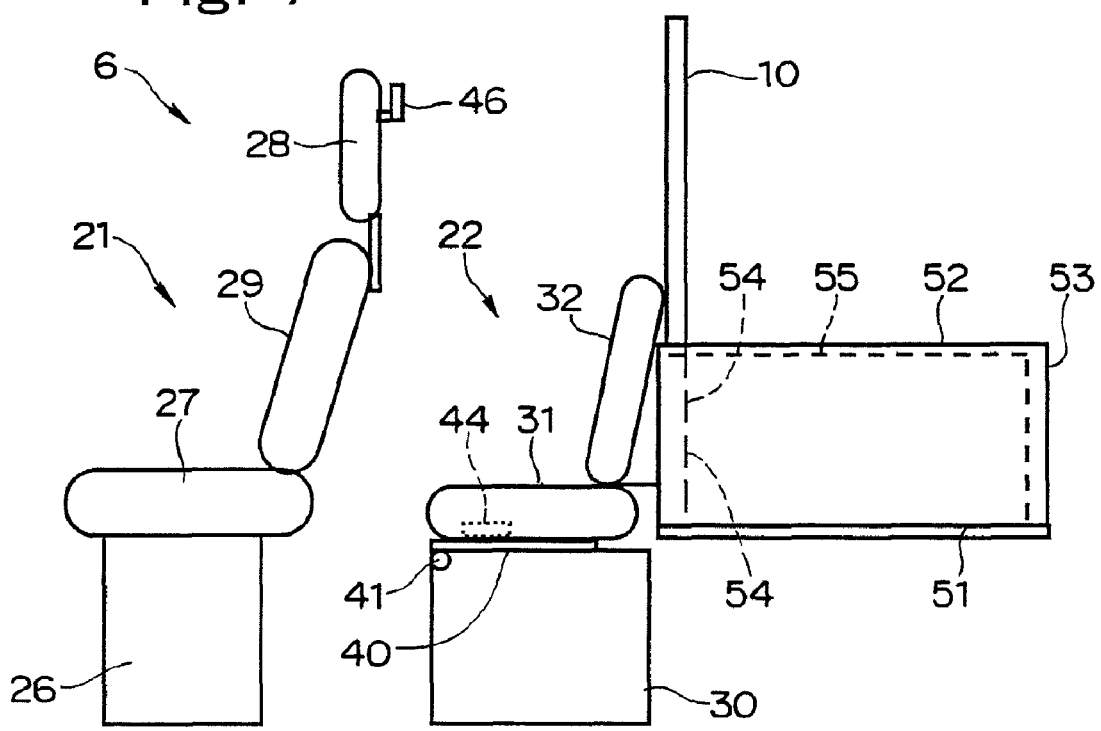
FIG. 7 is a left side view of a pick-up style utility vehicle according to a fourth embodiment of the present invention in the 4 passengers transformation.
Figure 8:
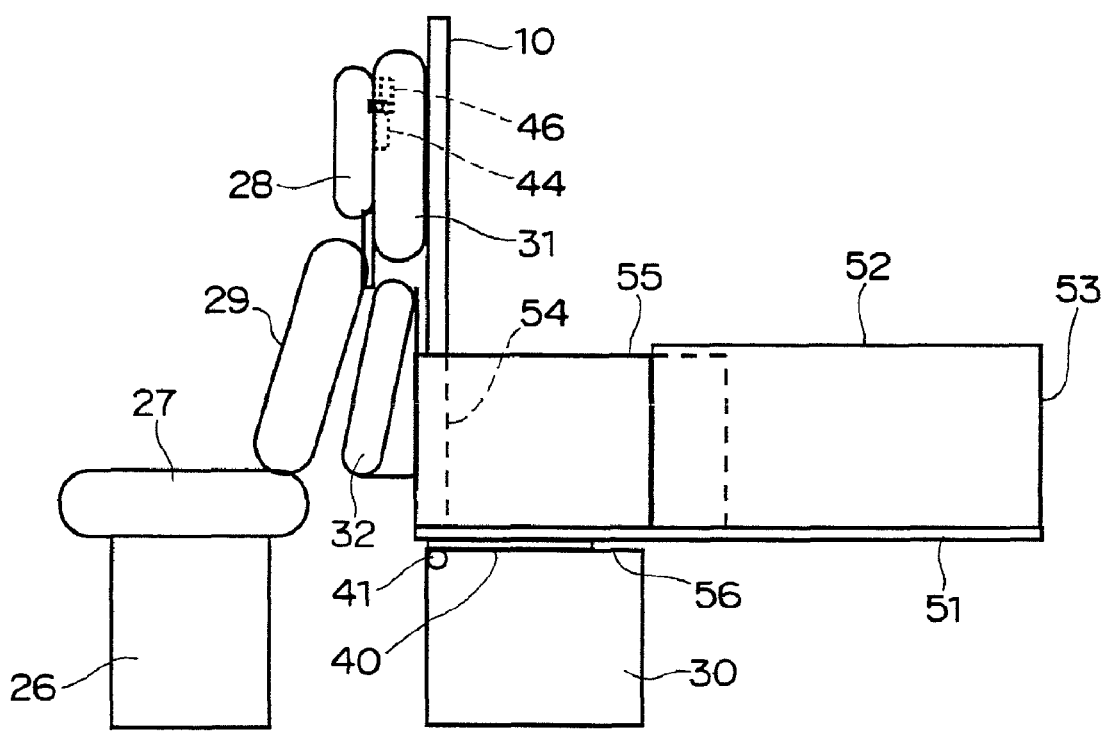
FIG. 8 is a left side view of the pick-up style utility vehicle of FIG. 7 in the 2 passengers transformation.
Figure 9:
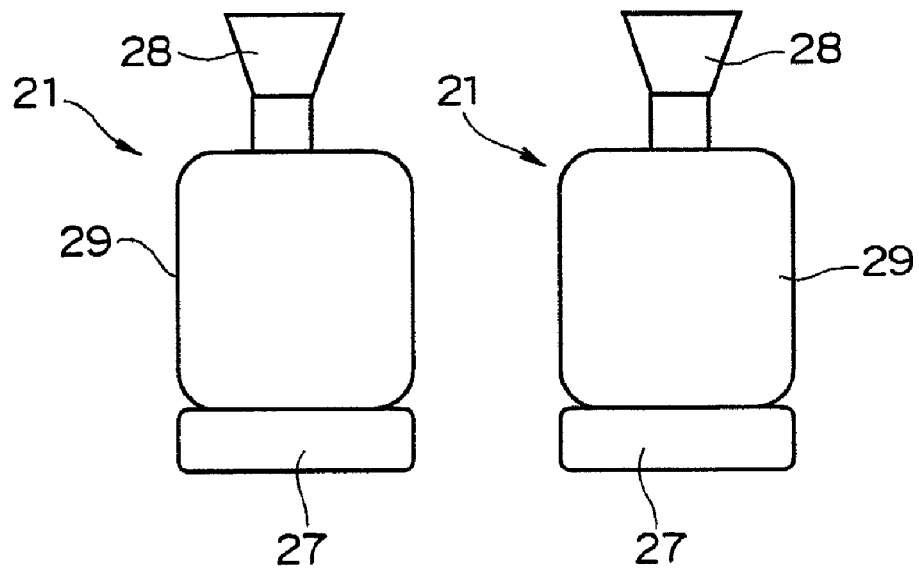
FIG. 9 is a front view of FIG. 7.
Figure 10:
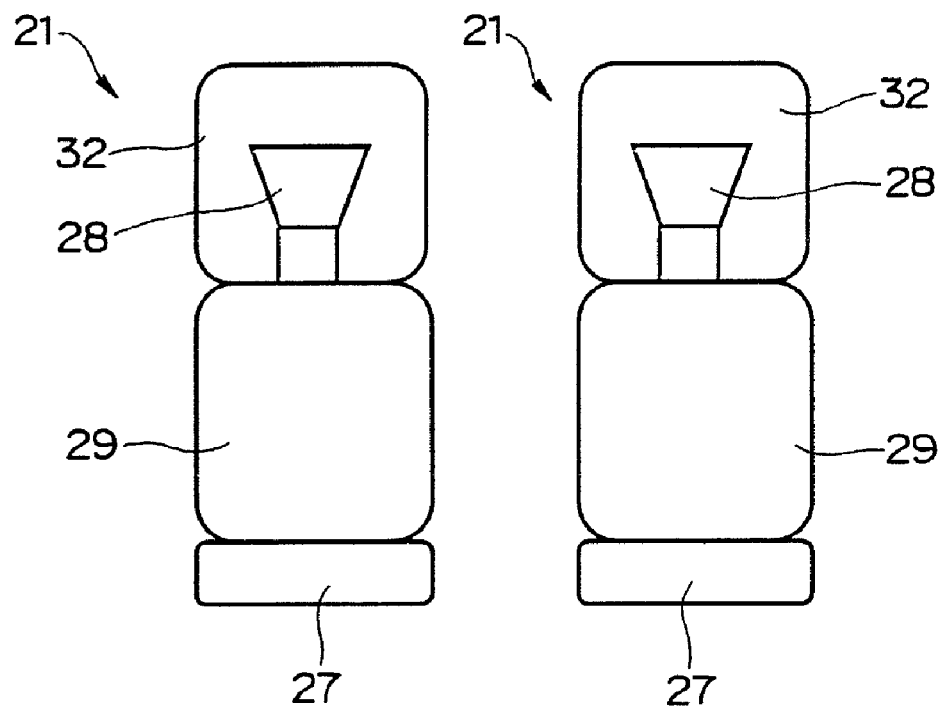
FIG. 10 is a front view of FIG. 8.

FIGS. 7 to 10 show a fourth embodiment of the present invention. FIG. 7 is a left side view of the 4 passengers transformation when the cargo bed 9 is not expanded. FIG. 8 is a left side view of the 2 passengers transformation when the cargo bed 9 is expanded forward. FIG. 9 is a front view of FIG. 7, and FIG. 10 is a front view of FIG. 8.

The fourth embodiment is different from the first embodiment in that the front seat 21 and the rear seat 22 are of a type divided to the left and right. As shown in FIG. 9, headrests 28 and 28 are provided at the upper ends of the left and right backrests 29 and 29 of the front seat 21. As shown in FIGS. 7 and 8, the seat holding portions (hooks) 46 and 46 for holding the left and right seat bottoms 31 and 31 of the rear seat 22 are provided on the rear surfaces of the headrests 28 and 28. Other configurations are the same as those of the first embodiment. Like components are indicated by like reference numerals.

According to the fourth embodiment, when the cargo bed 9 is expanded forward, as shown in FIG. 8, the left and right seat bottoms 31 and 31 of the rear seat 22 are held by the seat holding portions 46 of the left and right headrests 28 and 28 of the front seat 21. Needless to say, the forward expanded area of the cargo bed 9 can be largely secured. As shown in FIG. 10, the view of the rear side from the front seat 21 can be sufficiently secured through between the left and right seat bottoms 31 and 31. In addition, the seat bottoms 31 and 31 of the rear seat 22 are of a type divided to the left and right. Therefore, the labor for moving the seat bottoms 31 and 31 can be smaller than that of the case of the bench-shaped rear seat. Further, the seat bottoms 31 and 31 themselves can be used as the screen shield in the 2 passengers transformation.

Fifth Embodiment

Figure 11:
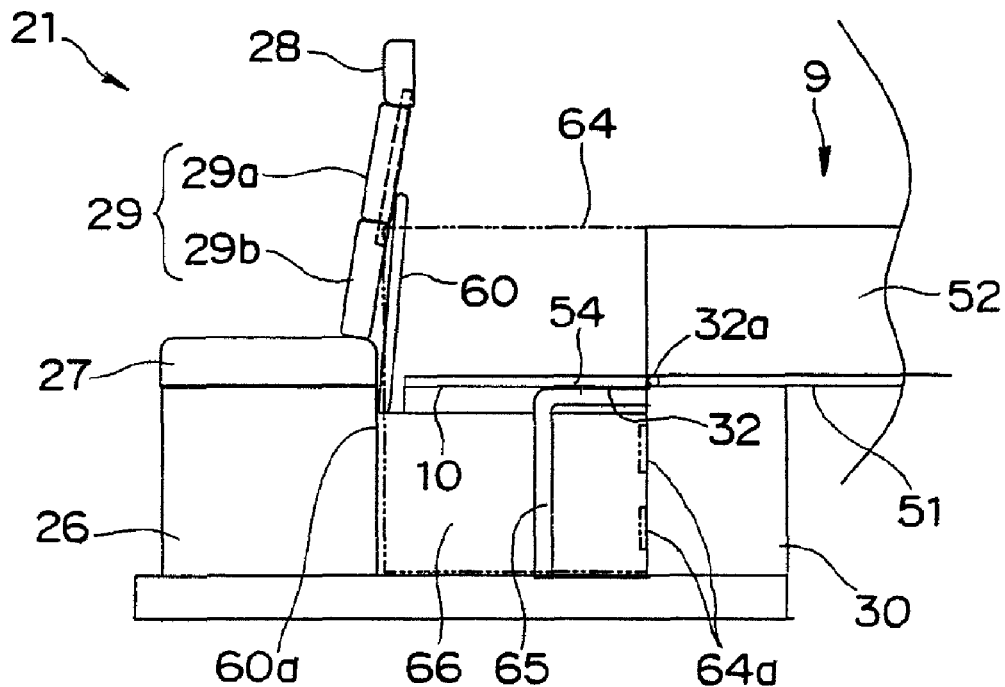
FIG. 11 is a left side view of a pick-up style utility vehicle according to a fifth embodiment of the present invention in the 2 passengers transformation.
Figure 12:
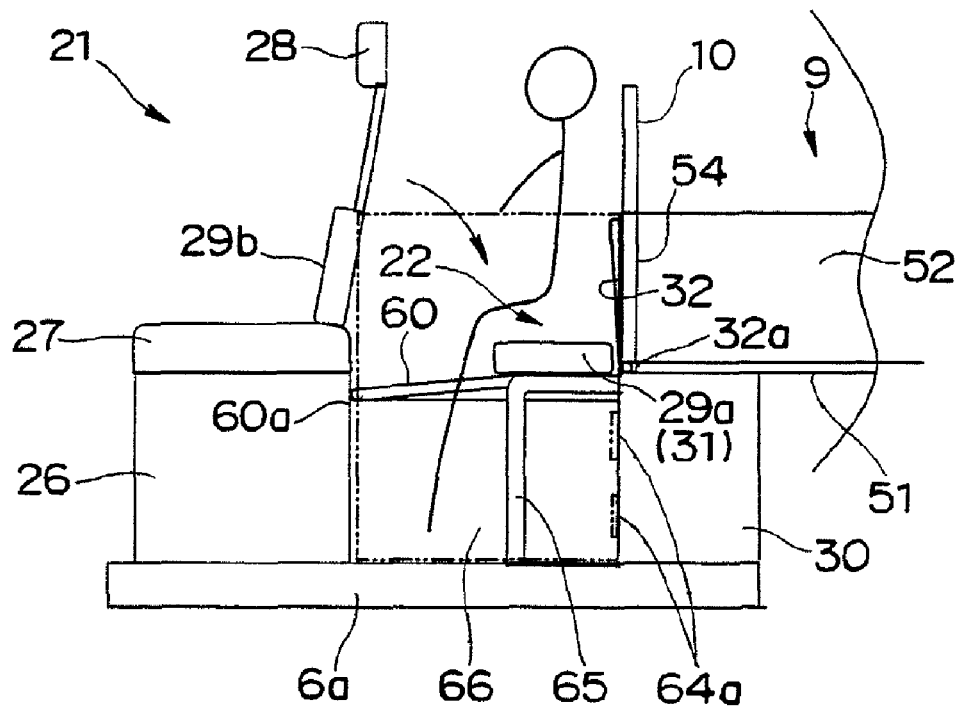
FIG. 12 is a left side view of the pick-up style utility vehicle of FIG. 11 in the 4 passengers transformation.

FIGS. 11 and 12 show a fifth embodiment of the present invention. FIG. 11 is a left side view of the 2 passengers transformation when the cargo bed 9 is expanded forward. FIG. 12 is a left side view of the 4 passengers transformation when the cargo bed 9 is not expanded. The same components as those of the first embodiment are indicated by the same reference numerals.

In FIG. 11, the front seat 21 has the seat bottom 27, the backrest 29, and the headrest 28, and the backrest 29 is divided into an upper portion 29a and a lower portion 29b. The lower portion 29b is fixed to the rear end of the seat bottom 27. The upper portion 29a is attached to the upper end of a supporting arm 60. The supporting arm 60 is extended downward. A lower end (pivot portion) 60a of the supporting arm 60 is rotatably supported by the rear surface of the seat leg 26. The supporting arm 60 is rotated about the lower end 60a rearward so that the upper portion 29a is position changeable from a first position between the lower portion 29b and the headrest 28, as shown in FIG. 11, to a second position in front of the front panel 54 of the cargo bed 9, as shown in FIG. 12.

The upper member 29a in the second position is supported by the upper ends of L-shaped pipes 65 provided at the left and right ends of the floor plate 6a and the upper end of a convex portion 66 for housing a drive shaft. The convex portion 66 is raised in the center of the width of the vehicle, and is used as the seat bottom of the rear seat 22. In this case, a passenger is seated forward in the upper portion 29a.

In the 4 passengers transformation shown in FIG. 12, the screen shield 10, the front panel 54 of the cargo bed 9, and the backrest 32 of the rear seat 22 are integrally erected at the front end of the cargo bed 9 in the non-expanded state. The lower end of the front panel 54 is rotatably supported at the front end of the bottom plate 51 of the cargo bed 9 by a hinge 32a. The screen shield 10, the backrest 32, and the front panel 54 are integrally fallen about the hinge 32a forward to configure the expandable portion of the bottom plate 51 of the cargo bed 9 in the expanded state, as shown in FIG. 11.

Openable and closeable doors (indicated by an alternate long and two short dashed line) 64 are provided at the left and right ends in a rear leg space. Each of the doors 64 is rotatably supported by the box 30 via hinges 64a and is opened outward in a vehicle width direction. The height of the door 64 substantially coincides with the height of the side panel 52 of the cargo bed 9. Accordingly, as shown in FIG. 11, the upper portion of the door 64 serves as the expandable side panel of the forward expandable portion of the cargo bed 9 in the 2 passengers transformation.

In the 2 passengers transformation shown in FIG. 11, the upper portion 29a of the backrest 28 of the front seat 21 is fixed to the upper end (the first position) of the lower portion 29b by a fixing mechanism (not shown) such as a pin. The screen shield 10, the front panel 54, the backrest 32 of the rear seat 22 are fallen forward in a substantially horizontal state and as described above, serve as the expandable portion of the bottom plate 51 of the cargo bed 9.

When the 2 passengers transformation shown in FIG. 11 is changed to the 4 passengers transformation, the screen shield 10, the front panel 54, and the backrest 32 of the rear seat 22 are integrally rotated about the hinge 32a rearward so as to be erected and the lock of the upper portion 29a of the backrest 29 of the front seat 21 is then released so that they are fallen from the first position to the second position behind it.

As shown in FIG. 12, the upper portion 29a is supported by the L-shaped pipe 65 and the convex portion 66 in the second position, and the screen shield 10 and the front panel 54 are fixed to the side panel 52 by the appropriate fixing mechanism.

The effects according to the embodiment will be summarized.

(1) When the cargo bed 9 is expanded forward, the seat bottom (the upper portion 29a) of the rear seat 22 is retracted as part of the backrest 29 of the front seat 21. Therefore, the expanded area of the cargo bed 9 can be larger than the prior art.

(2) The arm 60 of the upper portion 29a is fallen rearward so that the upper portion 29a can be easily installed as the seat bottom of the rear seat 22 in the predetermined position.

(3) The left and right doors 64 are designed to protect passengers in the 4 passengers transformation. On the other hand, the upper portion of each of the doors 64 is used as the expandable side panel of the cargo bed 9 in the 2 passengers transformation and the lower portion of each of the doors 64 prevents a load stored below the expandable portion of the cargo bed from being dropped.

Sixth Embodiment

Figure 13:
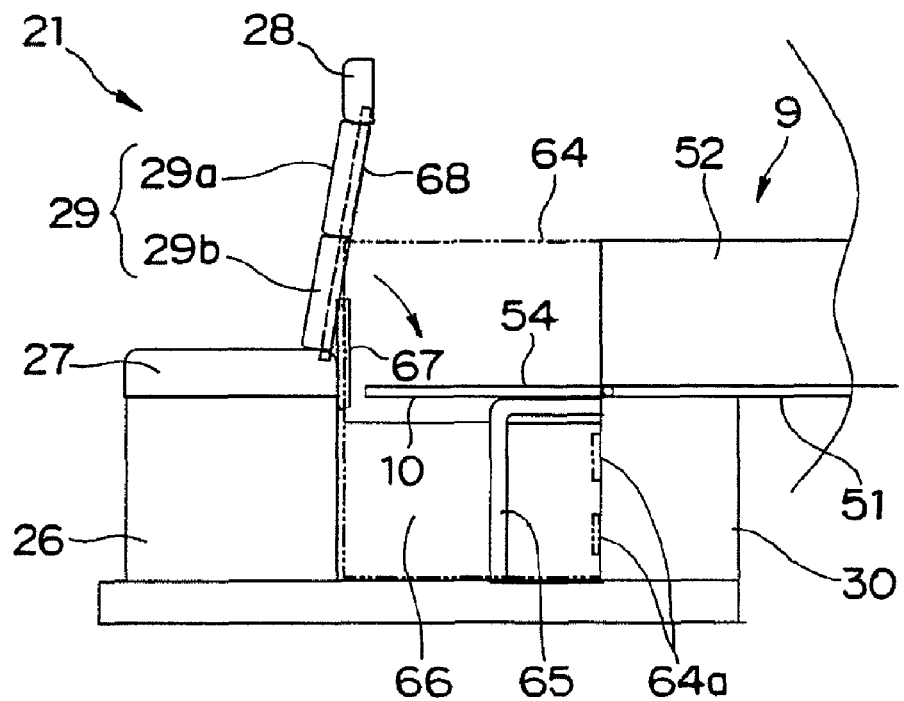
FIG. 13 is a left side view of a pick-up style utility vehicle according to a sixth embodiment of the present invention in the 2 passengers transformation.
Figure 14:
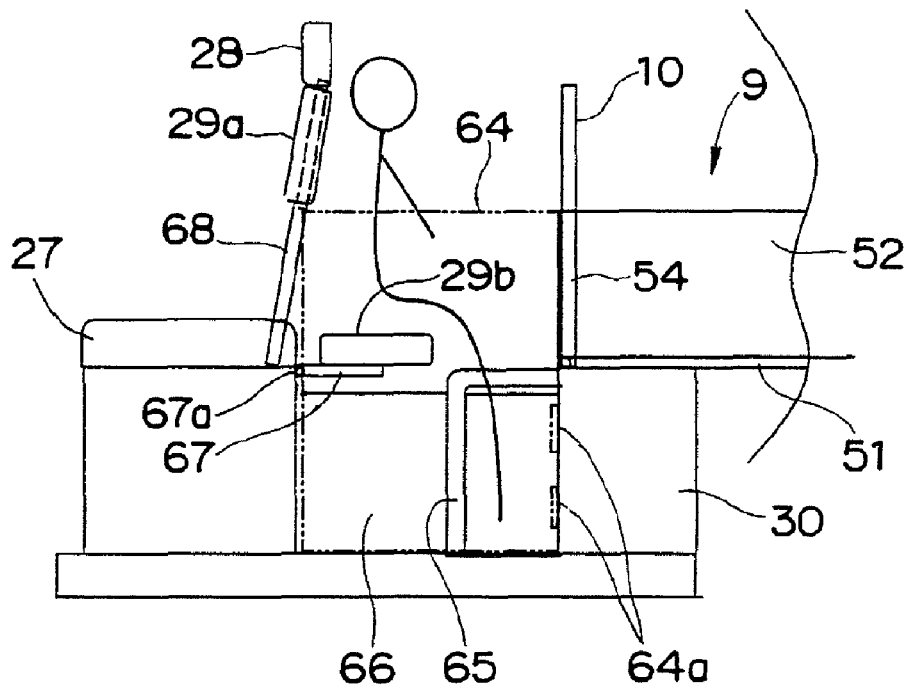
FIG. 14 is a left side view of the pick-up style utility vehicle of FIG. 13 in the 2 passengers transformation.

FIGS. 13 and 14 show a sixth embodiment of the present invention. FIG. 13 is a left side view of the 2 passengers transformation when the cargo bed 9 is expanded forward. FIG. 14 is a left side view of the 4 passengers transformation when the cargo bed 9 is not expanded.

The sixth embodiment is a modified example of the fifth embodiment. The sixth embodiment is different from the fifth embodiment in that the backrest 29, which is divided into the upper portion and the lower portion, the lower portion 29b is coupled to the upper end of a rotatable arm 67 and the upper portion 29a is fixed to the rear end of the seat bottom 27 via a fixing arm 68. The rotatable arm 67 is located immediately behind the seat bottom 27 of the front seat 21 in the second position in which it is rotated rearward to a horizontal state. Therefore, a passenger is seated rearward in the lower portion 29b in the second position.

The screen shield 10, the front panel 54, the left and right L-shaped pipes 65 and 65, the convex portion 66 in the center of the width of the vehicle, and the left and right doors 64 and 64 have the same configurations as those of the fifth embodiment. However, the backrest is not provided on the front surface of the front panel 54 of the cargo bed 9.

The changing operation between the 2 passengers transformation and the 4 passengers transformation is basically the same as that of the fifth embodiment.

Seventh Embodiment

Figure 15:
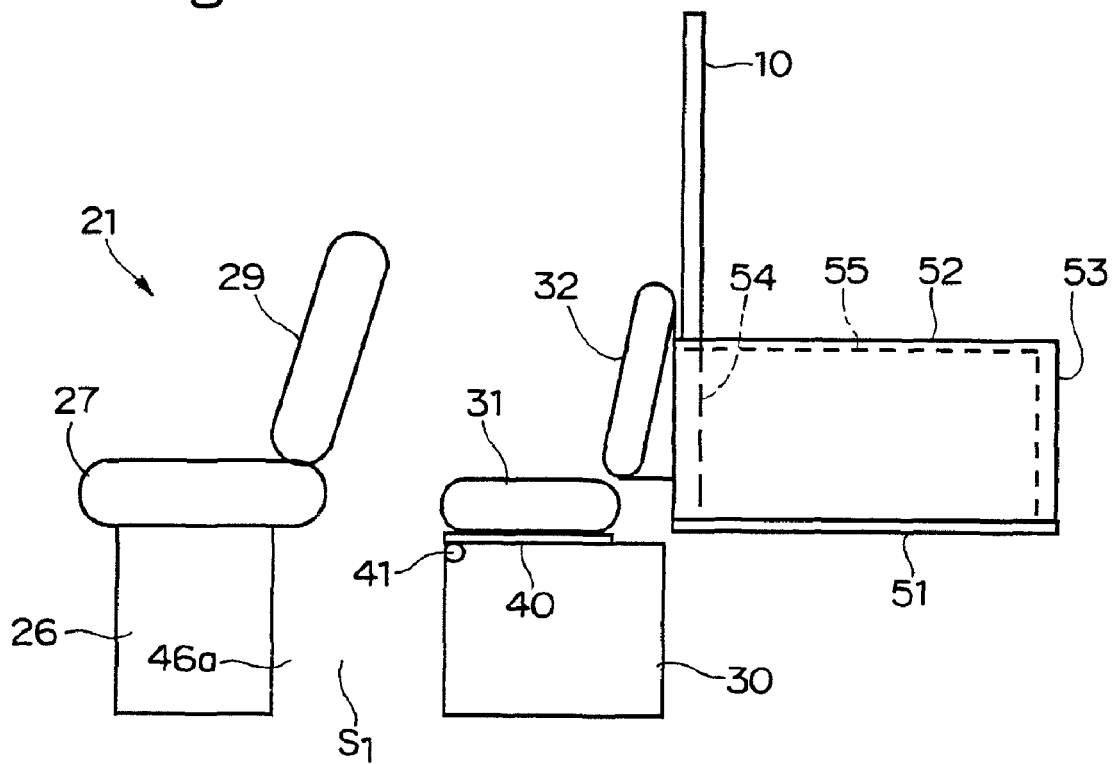
FIG. 15 is a left side view of a pick-up style utility vehicle according to a seventh embodiment of the present invention in the 4 passengers transformation.
Figure 16:
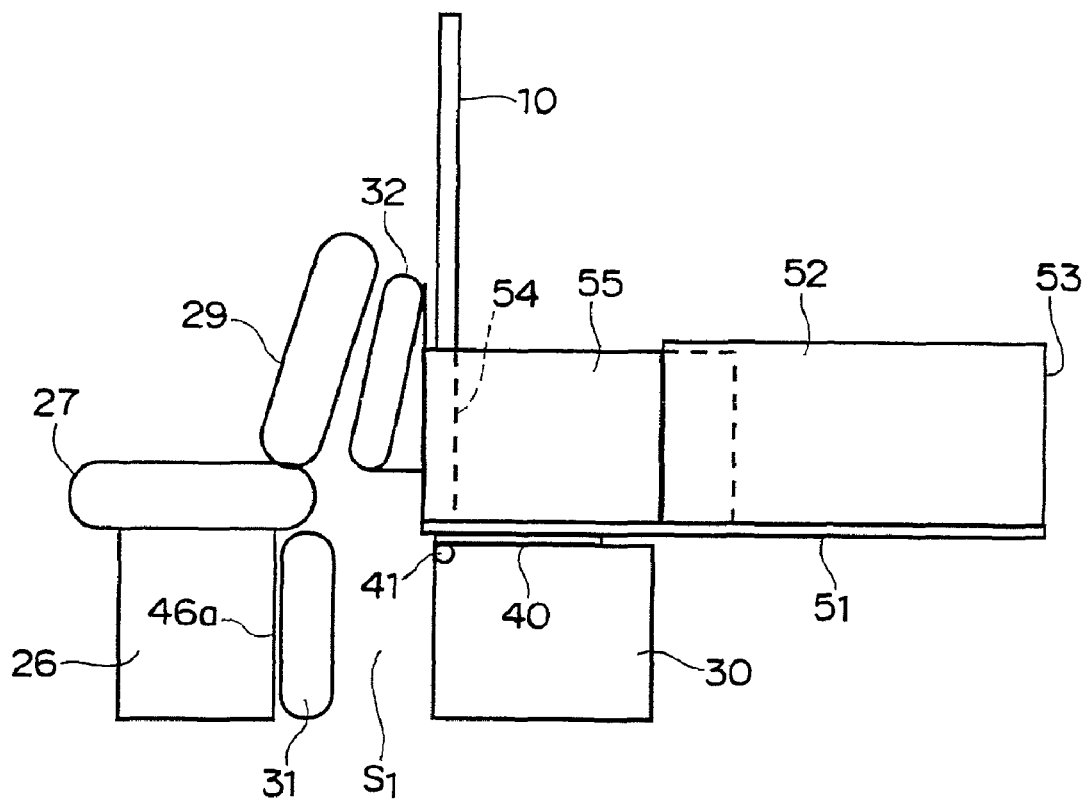
FIG. 16 is a left side view of the pick-up style utility vehicle of FIG. 15 in the 2 passengers transformation.

FIGS. 15 and 16 show a seventh embodiment of the present invention. FIG. 15 is a left side view of the 4 passengers transformation when the cargo bed 9 is not expanded. FIG. 16 is a left side view of 2 the passengers transformation when the cargo bed 9 is expanded forward.

In FIG. 15, as in the first embodiment, the seat bottom 31 of the rear seat 22 is detachably fixed to the rear seat attaching plate (rear seat attaching portion) 40 by a bolt or the like. As shown in FIG. 16, the seventh embodiment is different from the first embodiment in that the detached seat bottom 31 is retracted by a seat holding portion 46a in a rear leg space 51 behind the front seat 21. Other configurations are the same as those of the first embodiment. Like components are indicated by like reference numerals.

Specifically, the seat bottom 31 in the seat holding portion 46a is retracted so as to lean against the rear surface of the seat leg 26 of the front seat 21 and is fixed by an appropriate fixing means such as a pin(not shown).

According to the embodiment, when the 4 passengers transformation is changed to the 2 passengers transformation to expand the cargo bed 9 forward, the seat bottom 31 of the rear seat 22 is retracted and held in the position in which it does not obstruct the forward expansion of the cargo bed 9. Therefore, the expanded area of the cargo bed 9 can be larger than the prior art.

Eighth Embodiment

Figure 17:
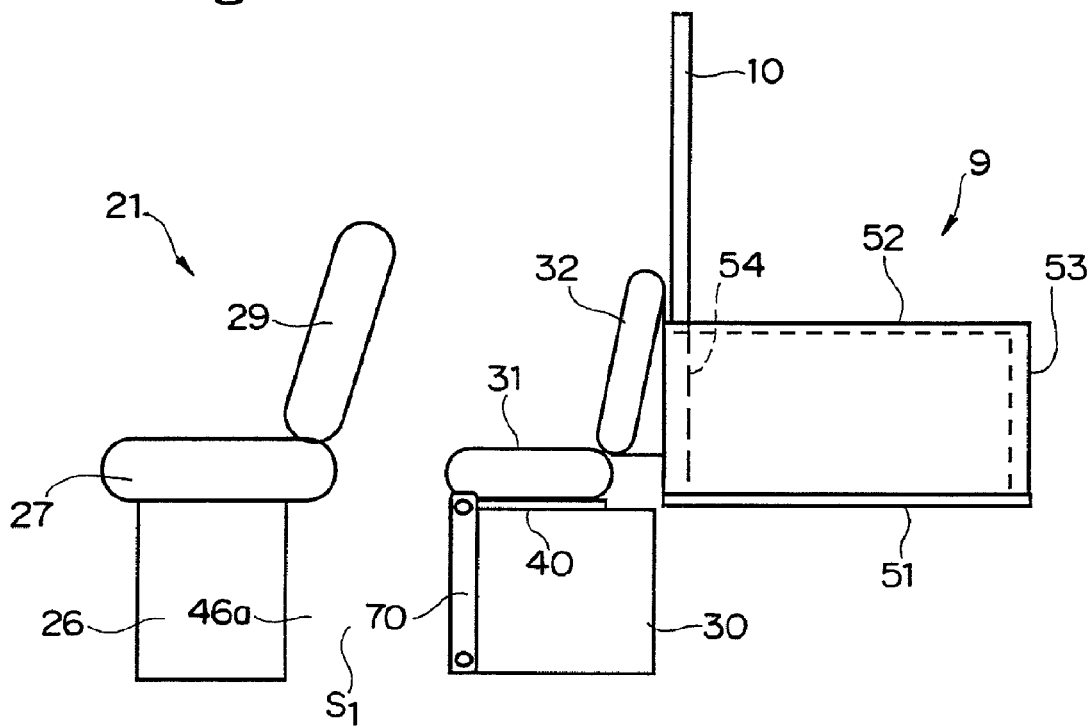
FIG. 17 is a left side view of a pick-up style utility vehicle according to an eighth embodiment of the present invention in the 4 passengers transformation.
Figure 18:
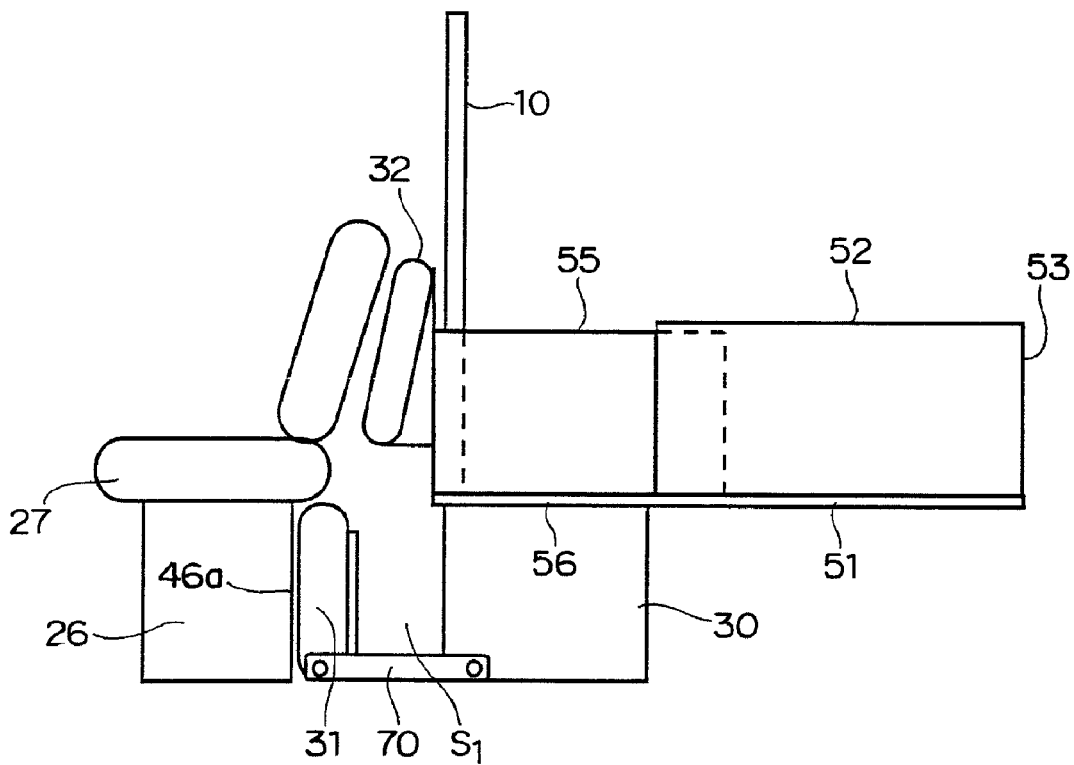
FIG. 18 is a left side view of the pick-up style utility vehicle of FIG. 17 in the 2 passengers transformation.

FIGS. 17 and 18 show an eighth embodiment of the present invention. FIG. 17 is a left side view of the 4 passengers transformation when the cargo bed 9 is not expanded. FIG. 18 is a left side view of the 2 passengers transformation when the cargo bed 9 is expanded forward.

The eighth embodiment improves the seventh embodiment. To lightly and reliably perform the moving operation of the seat bottom 31 of the rear seat 22, the seat bottom 31 is supported by the front lower end of the box 30 or the floor plate by a rotatable link 70. Therefore, the seat bottom 31 can be easily moved between the upper end face of the box 30 shown in FIG. 17 and the rear surface of the seat leg 26 of the front seat 21.

Ninth Embodiment

Figure 19:
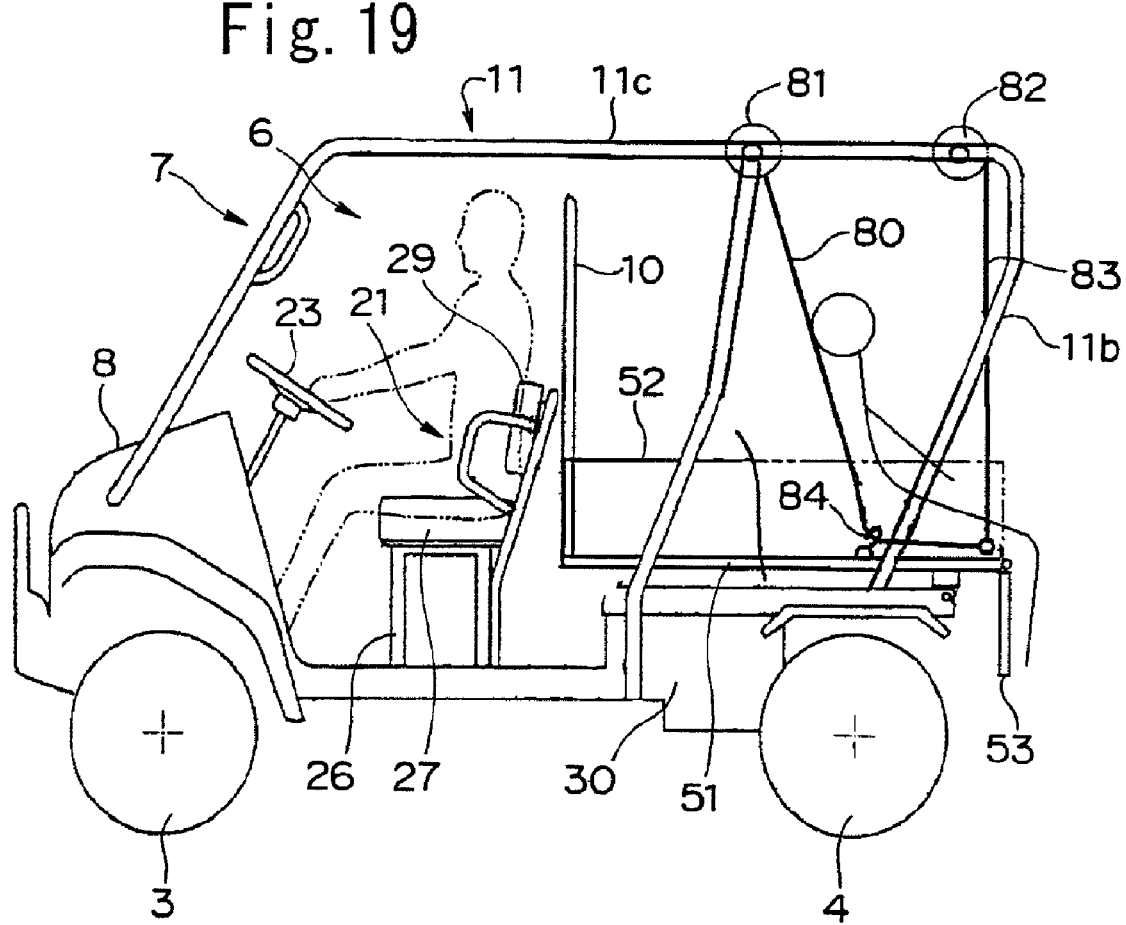
FIG. 19 is a left side view of a pick-up style utility vehicle according to a ninth embodiment of the present invention in the 4 passengers transformation.

FIG. 19 is a left side view of the 4 passengers transformation according to a ninth embodiment of the present invention. A hammock type rear seat 80 formed by a cloth or net is retractably provided in the rear portion of the cargo bed 9.

The cabin frame 7 is extended rearward to the rear portion of the cargo bed 9. A winding device 81 for winding the rear seat 80 and a suspending portion 82 winding a rope 83 for suspending the end (the lower end) of the rear seat 80 are provided on the upper side portion 11c of the cabin frame 7. A hook 84 for holding the rear seat 80 in a substantially L-shaped or curved form is provided on the bottom plate 51 of the cargo bed 9. Other configurations are the same as those of the first embodiment. The same components as the first embodiment are indicated by the same reference numerals.

When the 2 passengers transformation is changed to the 4 passengers transformation, the rear seat 80 is pulled down from the winding device 81, the middle portion of the rear seat 80 is hooked onto the hook 84, and the end of the rear seat 80 is suspended by the rope 83 near the rear end of the bottom plate 51 of the cargo bed 9. The rigid body movement of the rear seat 22 can be regulated by the hook 84 in 4 passengers transformation. The rear panel 53 of the cargo bed 9 is opened and hangs down. The legs of a passenger can be protected by the rear panel 53. The passenger is seated in a rearward posture on the hammock type rear seat 80.

When the 4 passengers transformation is changed to the 2 passengers transformation to widely use the cargo bed 9, the rear seat 80 is detached from the rope 83 and the hook 84 and is wound by the winding device 81. The rope 83 is wound by the suspending portion 82. Therefore, the entire surface of the cargo bed 9 can be used for loading loads.

According to the embodiment, the hammock type rear seat 80 is wound and retracted by the winding device 81 so that the rear seat 22 can be easily installed or retracted by one person. Further, the reduction of the weight of the vehicle and the cost can be achieved. In addition, the hammock type rear seat 80 can be easily attached after the vehicle is purchased.

Tenth Embodiment

FIGS. 20 to 23 show a tenth embodiment of the present invention, which is always used in the 4 passengers transformation. The cargo bed 9 can be expanded forward by changing the position of the rear seat 22 in a front-rear direction. The same components as those of the first embodiment are indicated by the same reference numerals.

Figure 20:
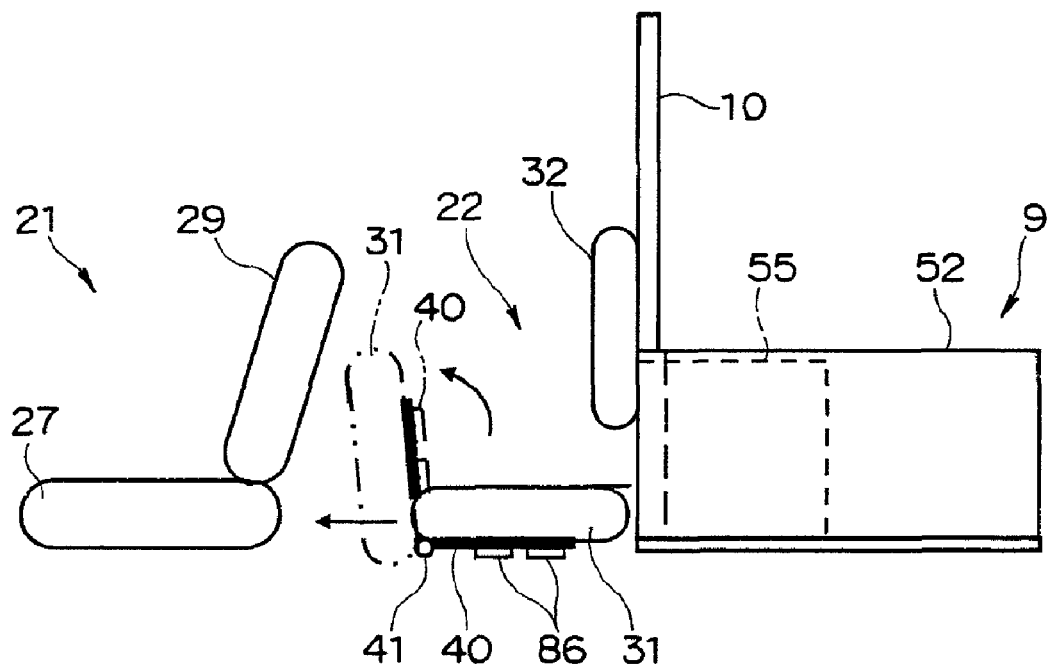
FIG. 20 is a left side view of a pick-up style utility vehicle according to a tenth embodiment of the present invention in the 4 passengers transformation.

FIG. 20 is a left side view showing the state in which the cargo bed 9 is not expanded. As in the first embodiment, the front end of the seat attaching plate 40 of the rear seat 22 is rotatably supported by the box 30 by the hinge 41. The seat bottom 31 is attached to the seat attaching plate 40 by a plurality of bolts 86.

Figure 22:
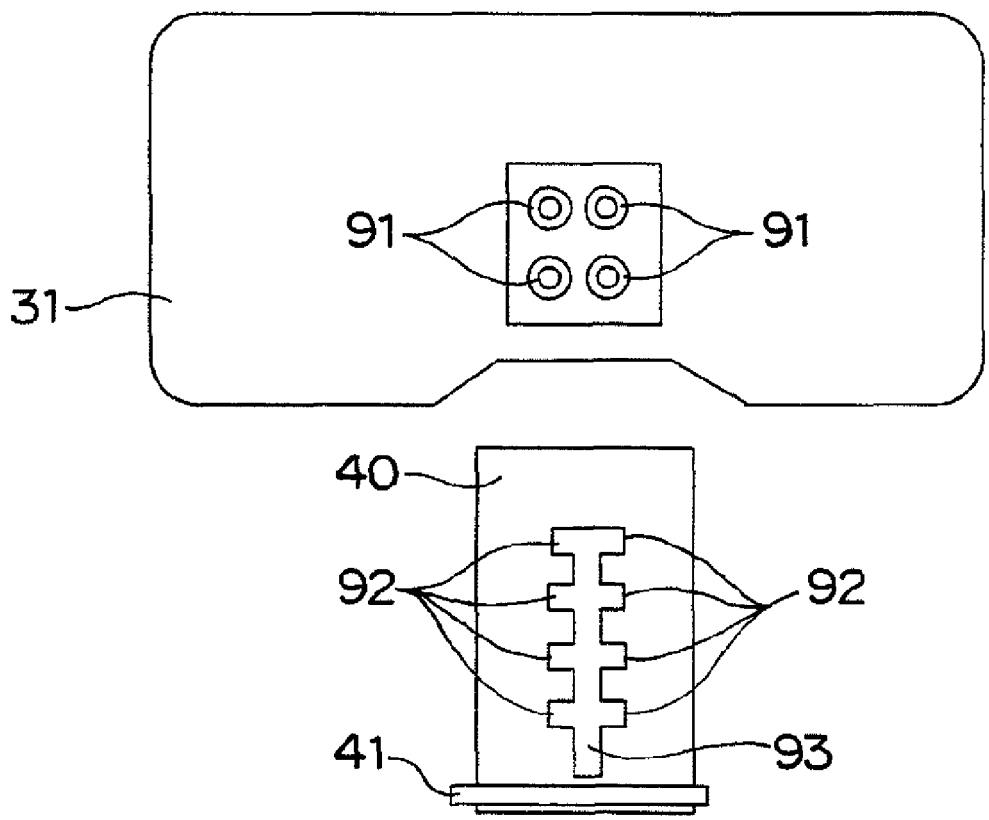
FIG. 22 is a rear view showing the state in which a seat bottom and a seat attaching plate of FIG. 20 are erected and disassembled.

FIG. 22 is a rear view showing the state in which the seat bottom 31 and the seat attaching plate 40 are erected and disassembled. Four female screw holes 91 are formed in four corners of a square on the back surface of the seat bottom 31. Four pairs of bolt insertion holes 92 and 92 spaced in a left-right direction are arranged in the seat attaching plate 40 at equally spaced intervals in a front-rear direction.

Figure 23:
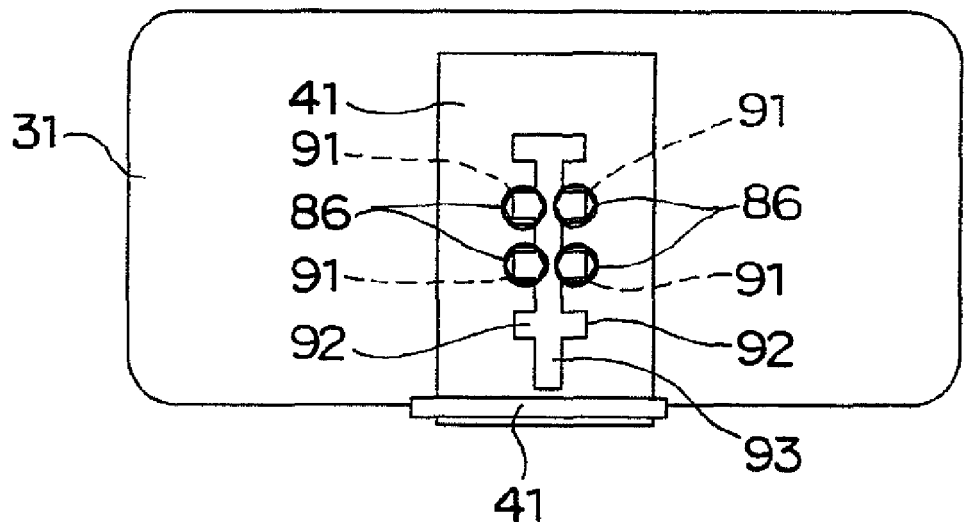
FIG. 23 is a rear view showing the state in which the seat bottom and the seat attaching plate of FIG. 20 are erected and coupled.

FIG. 23 shows the state in which the seat bottom 31 is attached to the seat attaching plate 41. The four female screw holes 91 of the seat bottom 31 are matched with, of the four pairs of bolt insertion holes 92 and 92 of the seat attaching plate 40, the two pairs of bolt insertion holes 92 arranged in the middle in a front-rear direction. The four bolts 86 are inserted through the four bolt insertion holes 92 in the middle portion in a front-rear direction and are screwed into the female screw holes 91, thereby fixing the seat bottom 31 to the seat attaching plate 40.

Of the four pairs of bolt insertion holes 92, the two pairs of bolt insertion holes 92 adjacent in a front-rear direction are selected and are matched with the four female screw holes 91 of the seat bottom 31. Thus, the position of the seat bottom 31 in a front-rear direction relative to the seat attaching plate 40 can be changed.

FIG. 20 shows the state in which the seat bottom 31 of the rear seat 22 is attached to the seat attaching plate 40 in the rearmost position and that the cargo bed 9 is contracted to a maximum. When the cargo bed 9 is expanded from this state, the seat attaching plate 40 and the seat bottom 31 are erected about the hinge 41 forward, as indicated by an alternate long and two short dashed line.

Only the two bolts 86 of the left or right side in FIG. 23 are unscrewed from the seat bottom 31 and the seat attaching plate 40. The other two bolts 86 are loosened. The seat bottom 31 is moved to the right or left so that the two loosened bolts 86 are moved to a guide groove 93.

Figure 21:
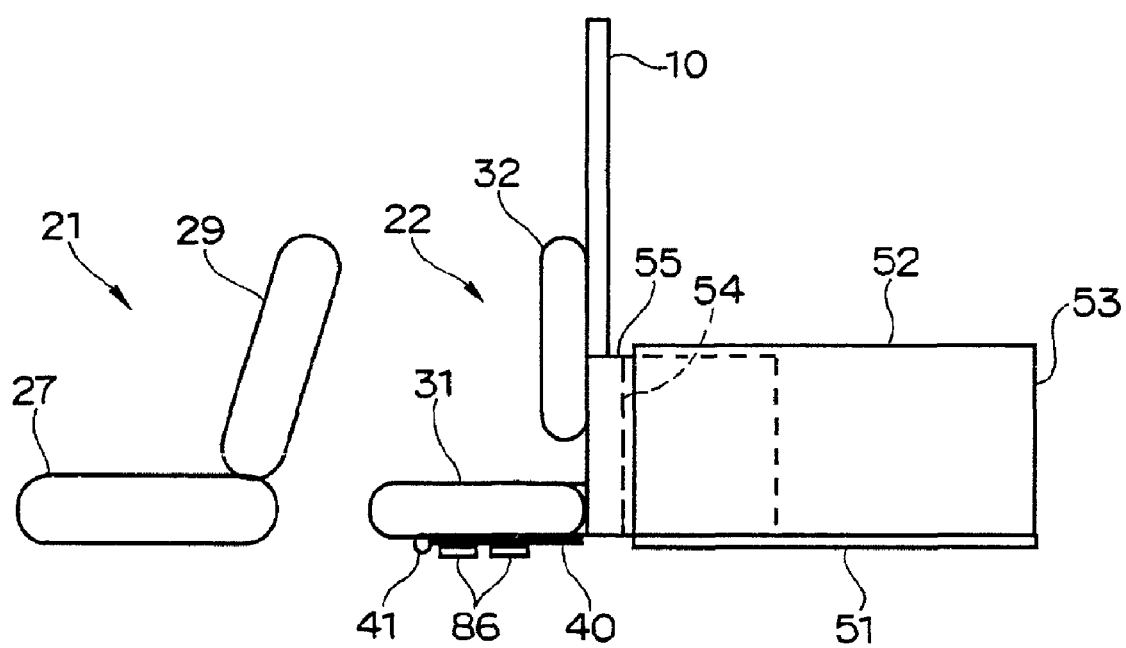
FIG. 21 is a left side view of the pick-up style utility vehicle of FIG. 20 showing the state in which a cargo bed is expanded.

The seat bottom 31 is moved in a front-rear direction relative to the seat attaching plate 40. The seat bottom 31 is moved to the left or right again in the desired position in a front-rear direction to move the loosened bolts 86 from the guide groove 93 to the bolt insertion holes 92. The unscrewed bolts 86 are inserted through the corresponding bolt insertion holes 92 and are screwed into the female screw hole 91. Thus, the changing operation is completed. FIG. 21 shows the state in which the seat bottom 31 is changed forward from FIG. 20.

According to the tenth embodiment, the seat bottom 31 is rigidly fixed to the seat attaching plate 40 by the four bolts 86. The guide groove 93 extended in a front-rear direction and communicating the respective bolt insertion holes 92 with each other is formed between the left and right bolt insertion holes 92. Only two of the four bolts 86 are unscrewed so that the seat bottom 31 can be moved to the desired position relative to the seat attaching plate 40.

Eleventh Embodiment

Figure 24:
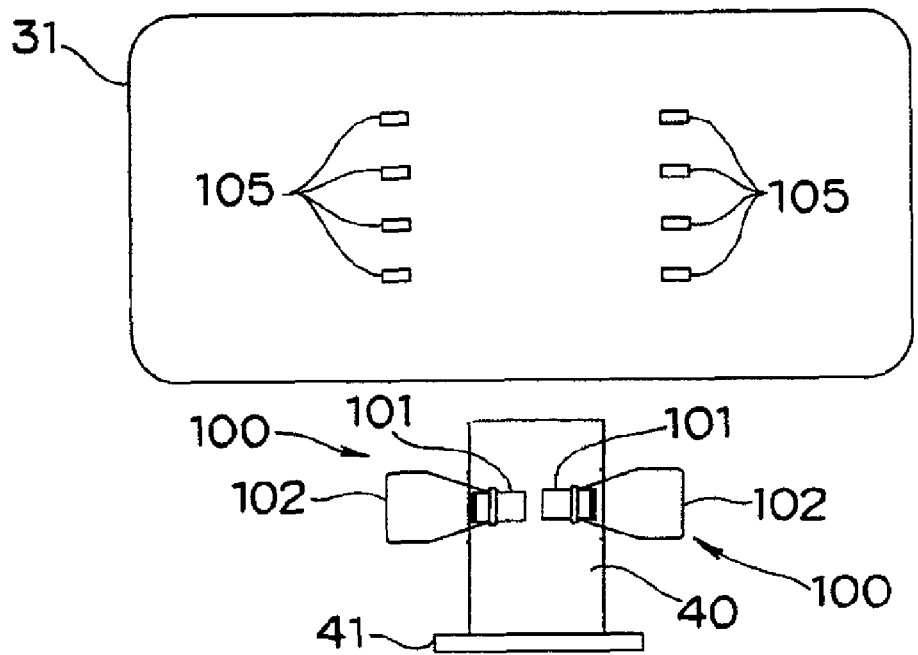
FIG. 24 is a rear view of an eleventh embodiment of the present invention in the state in which the seat bottom and the seat attaching plate are erected and disassembled as in FIG. 22.
Figure 25:
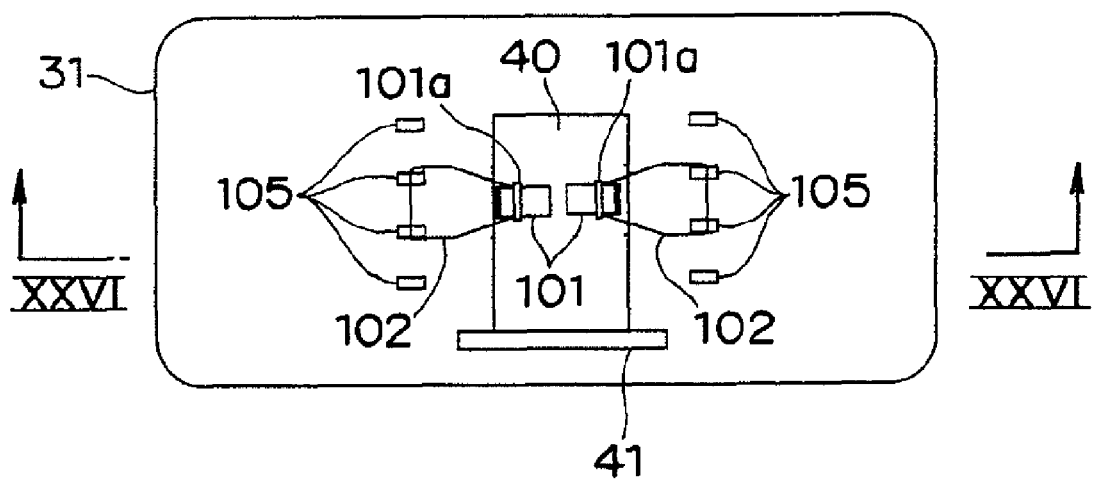
FIG. 25 is a rear view showing the state in which the seat bottom and the seat attaching plate are erected and coupled as in FIG. 23.
Figure 26:
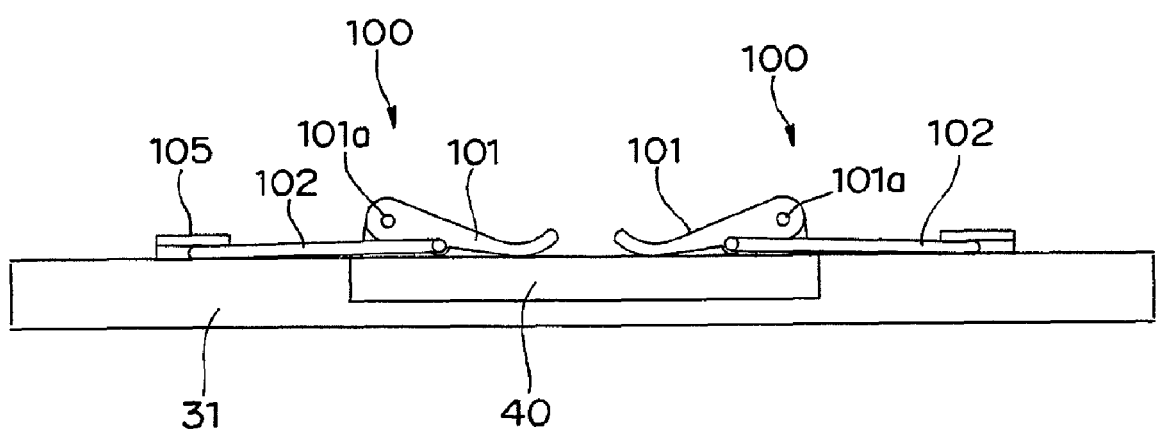
FIG. 26 is a sectional enlarged view taken along line XXVI-XXVI of FIG. 25.

FIGS. 24 to 26 show an eleventh embodiment of the present invention, which is a modified example of the tenth embodiment. FIG. 24 is a rear view of the rear seat corresponding to FIG. 22. FIG. 25 is a rear view of the rear seat corresponding to FIG. 23. FIG. 26 is a sectional enlarged view taken along line XXVI-XXVI of FIG. 25. The same components as those of the first embodiment are indicated by the same reference numerals.

In the eleventh embodiment, the fixing means of the seat bottom 31 is not a bolt, and has a pair of left and right toggle clamps 100 and 100 provided on the seat attaching plate 40 and eight hooks 105 formed in two rows spaced in a left-right direction on the back surface of the seat bottom 31. Three hook portion rows or more are enabled.

FIG. 26 shows the state in which the seat bottom 31 is fixed to the seat attaching plate 40 by the toggle clamps 100. Each of the toggle clamps 100 has a clamp lever 101 rotatably provided on the seat attaching plate 40 via a hinge 101a, and a wire ring 102 coupled to the clamp lever 101. The wire ring 102 is coupled to the clamp lever 101 in the position in which it is shifted from the hinge 101a to the end side of the clamp lever. The eight hooks 105 formed on the seat bottom 31 are formed in an L-shape and engage the wire ring 102.

When the position of the seat bottom 31 in a front-rear direction is changed, each of the clamp levers 101 of FIG. 26 is erected about the hinge 101a to unhook the wire ring 102 from the hook 105. After the seat bottom 31 is moved to the desired position in a front-rear direction relative to the seat attaching plate 40, the wire ring 102 is hooked onto the pair of corresponding hooks 105, as shown in FIG. 25, and the clamp lever 101 is rotated to the seat attaching plate 40 side, thereby fixing the seat bottom 31 to the seat attaching plate 40.

According to the eleventh embodiment, the seat bottom 31 can be fixed and released only by the rotational operation of the clamp lever 101 so that the fixing operation can be easier than the tenth embodiment.

Twelfth Embodiment

Figure 27:
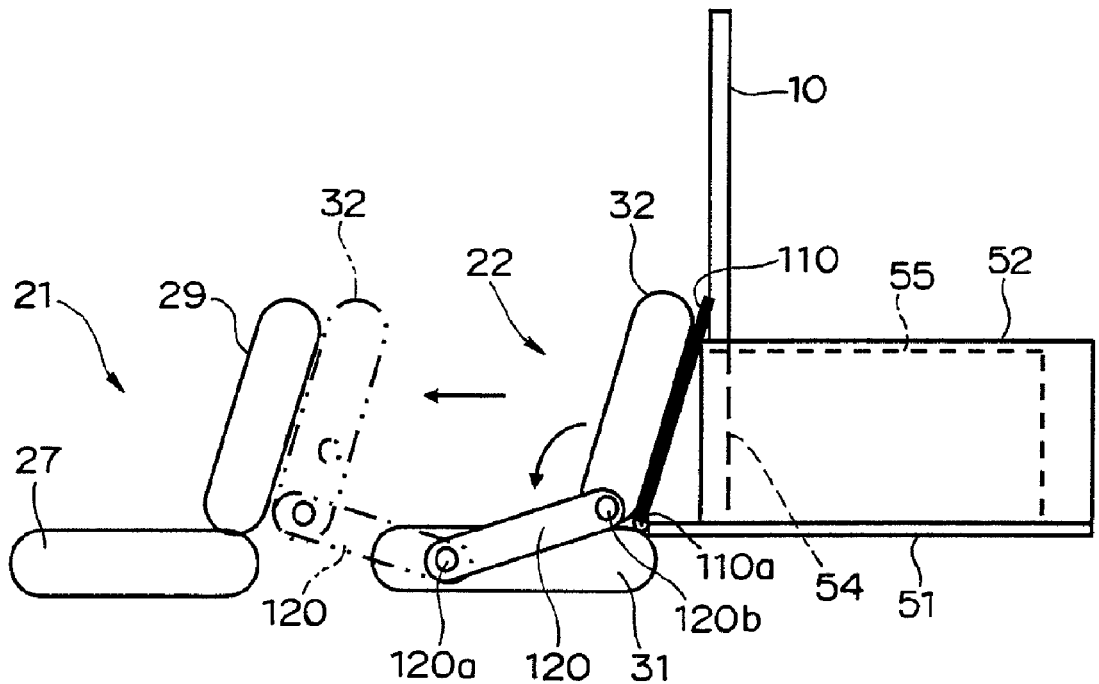
FIG. 27 is a left side view of a pick-up style utility vehicle according to a twelfth embodiment of the present invention in the 4 passengers transformation.
Figure 28:
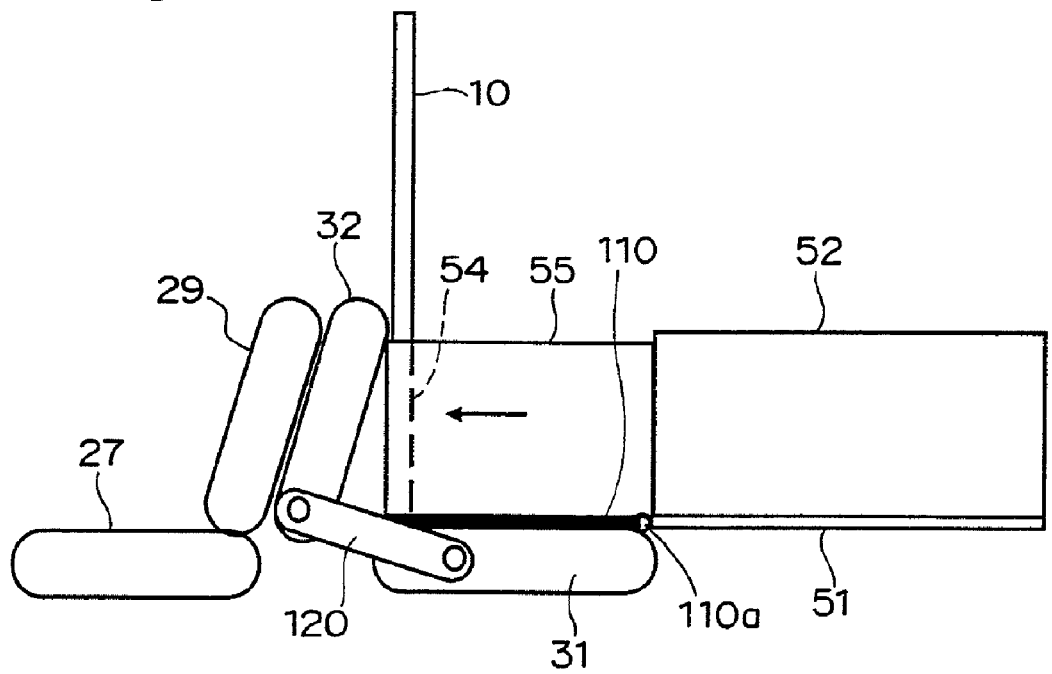
FIG. 28 is a left side view of the pick-up style utility vehicle of FIG. 27 in the 2 passengers transformation.

FIGS. 27 and 28 show a twelfth embodiment of the present invention. FIG. 27 is a left side view of the 4 passengers transformation when the cargo bed 9 is not expanded. FIG. 28 is a left side view of the 2 passengers transformation when the cargo bed 9 is expanded forward.

In FIG. 27, the seat bottom 31 of the rear seat 22 is rotatably coupled to one end 120b of a link 120, and the other end 120a of the link 120 is rotatably coupled to the seat bottom 31. Therefore the backrest 32 is position changeable between a first position in which it is located in an erected state at the rear end of the seat bottom 31, as shown in FIG. 27 and a second position at the front end of the seat bottom 31 and along the rear surface of the backrest 29 of the front seat 21, as shown in FIG. 28.

A bottom plate member 110 serving as the bottom plate of the cargo bed in the 2 passengers transformation is arranged on the rear surface of the backrest 32 in the first position of FIG. 27. The lower end of the bottom plate portion 110 is rotatably supported at the front end of the bottom plate 51 of the cargo bed 9 via a hinge 110a. Other configurations are the same as those of the first embodiment. Like components are indicated by like reference numerals.

When the 4 passengers transformation is changed to the 2 passengers transformation, the link 120 is rotated about the other end 120a in FIG. 27 so that the backrest 32 of the rear seat 22 is moved from the first position at the rear end of the seat bottom 31 to the second position at the front end. As shown in FIG. 28, the bottom plate portion 110 is rotated about the hinge 110a forward and is overlapped with the upper surface of the seat bottom 31.

The extendable side panel 55, the front panel 54, and the screen shield 10 of the cargo bed 9 are moved forward to expand the cargo bed 9.

According to the twelfth embodiment, when the cargo bed 9 is changed between the 2 passengers transformation and the 4 passengers transformation, the seat bottom 31 itself of the rear seat 22 need not be moved. Moreover, the backrest 32 is supported on the seat bottom 31 via the link 120 so that the backrest 32 can be easily moved by a light operation.

Thirteenth Embodiment

Figure 29:
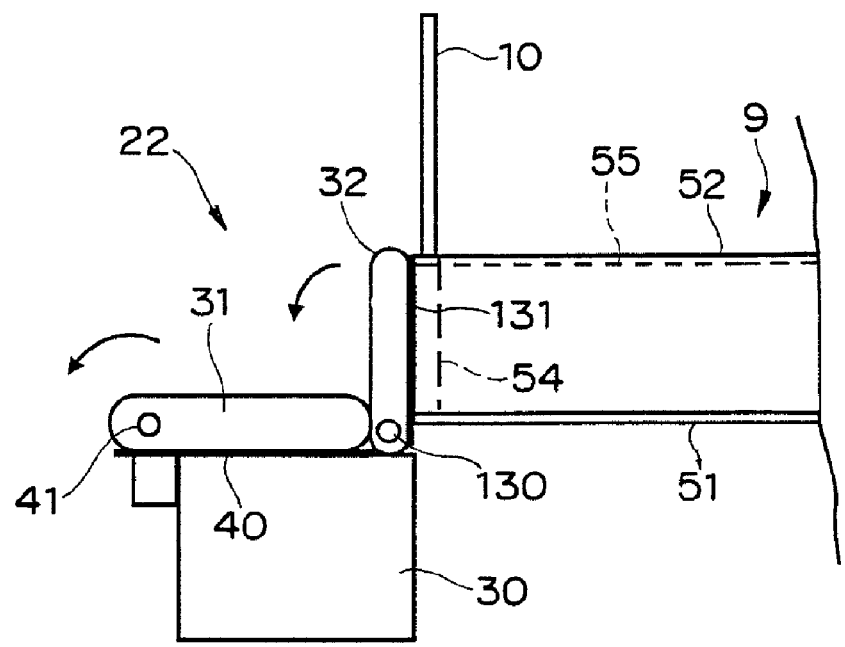
FIG. 29 is a left side view of a pick-up style utility vehicle according to a thirteenth embodiment of the present invention in the 4 passengers transformation.
Figure 30:
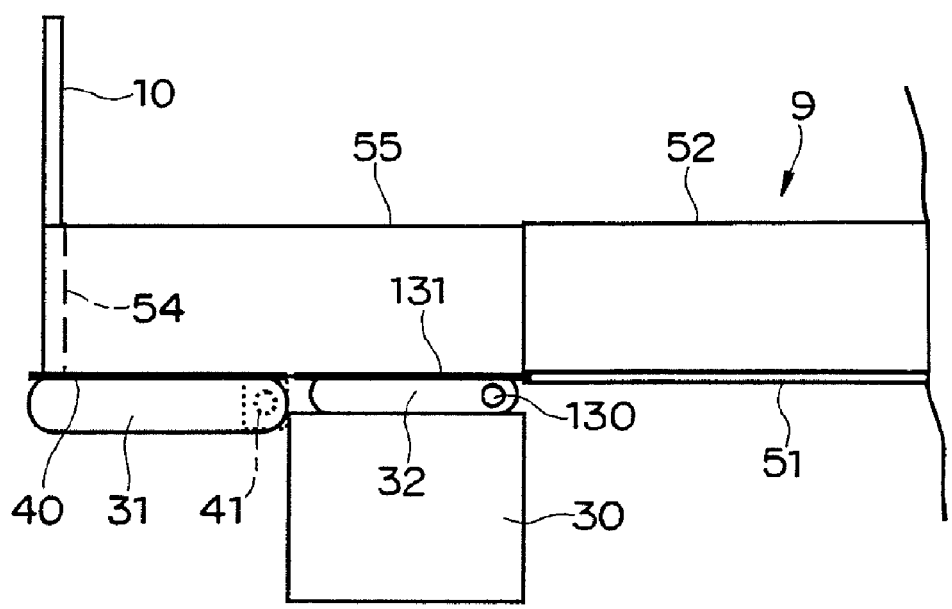
FIG. 30 is a left side view of the pick-up style utility vehicle of FIG. 29 in the 2 passengers transformation.

FIGS. 29 and 30 show a thirteenth embodiment of the present invention. FIG. 29 is a left side view of the 4 passen-
gers transformation when the cargo bed 9 is not expanded. FIG. 30 is a left side view of the 2 passengers transformation when the cargo bed 9 is expanded forward. The same components as those of the first embodiment are indicated by the same reference numerals.

In FIG. 29, as in the first embodiment, the seat bottom 31 of the rear seat 22 is fixed to the seat attaching plate 40 by a bolt or the like, and the front end of the seat attaching plate 40 is rotatably supported by the box 30 via the hinge 41. However, the seat bottom 31 of the thirteenth embodiment is rotated 180° forward from the used state of FIG. 29.

The backrest 32 of the rear seat 22 is rotatably supported at the rear end of the upper surface of the box 30 via a hinge 130. A bottom plate member 131 serving as the bottom plate of the cargo bed in the 2 passengers transformation is affixed to the rear surface of the backrest 32. Other configurations are the same as those of the first embodiment. Like components are indicated by like reference numerals.

When the 4 passengers transformation is changed to the 2 passengers transformation, the seat bottom 31 of the rear seat 22 is rotated 180° about the hinge 41 forward together with the seat attaching plate 40 in FIG. 29. The backrest 32 is then rotated about the hinge 130 forward and downward.

In FIG. 30, the seat bottom 31 is held substantially horizontally so that the seat attaching plate 40 is located in the same plane as the bottom plate 51 of the cargo bed 9, and the backrest 32 is also held substantially horizontally so that the bottom plate member 131 is located in the same plane as the bottom plate 51 of the cargo bed 9.

The expandable side panels 55, the front panel 54, and the screen shield 10 of the cargo bed 9 are moved forward to expand the cargo bed 9.

According to the thirteenth embodiment, when the cargo bed 9 is expanded, the seat attaching plate 40 and the rear surface of the backrest 32 of the rear seat 22 are used as the expandable portion of the bottom plate 51 of the cargo bed 9 so that the number of components can be reduced.

Fourteenth Embodiment

Figure 31:
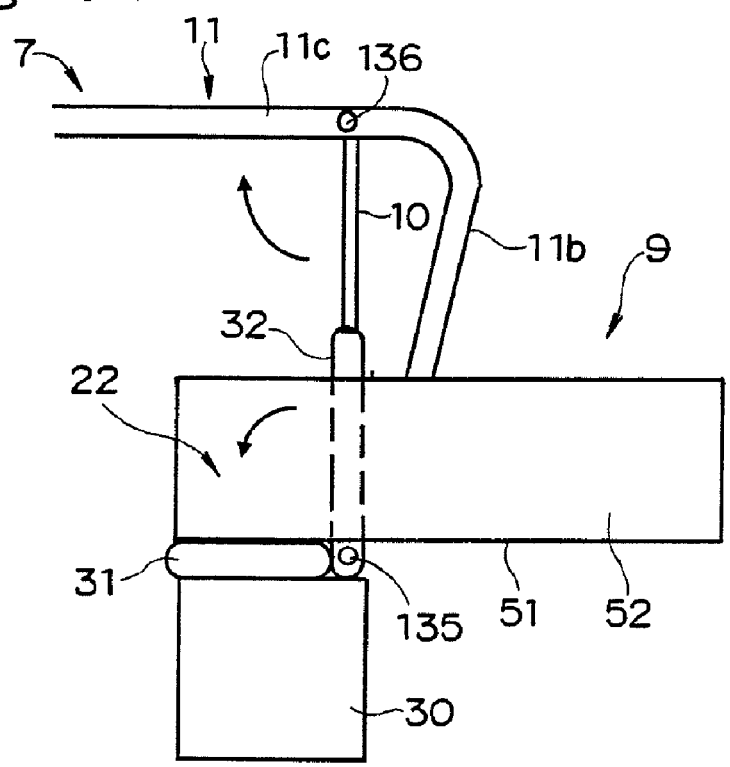
FIG. 31 is a left side view of a pick-up style utility vehicle according to a fourteenth embodiment of the present invention in the 4 passengers transformation.
Figure 32:
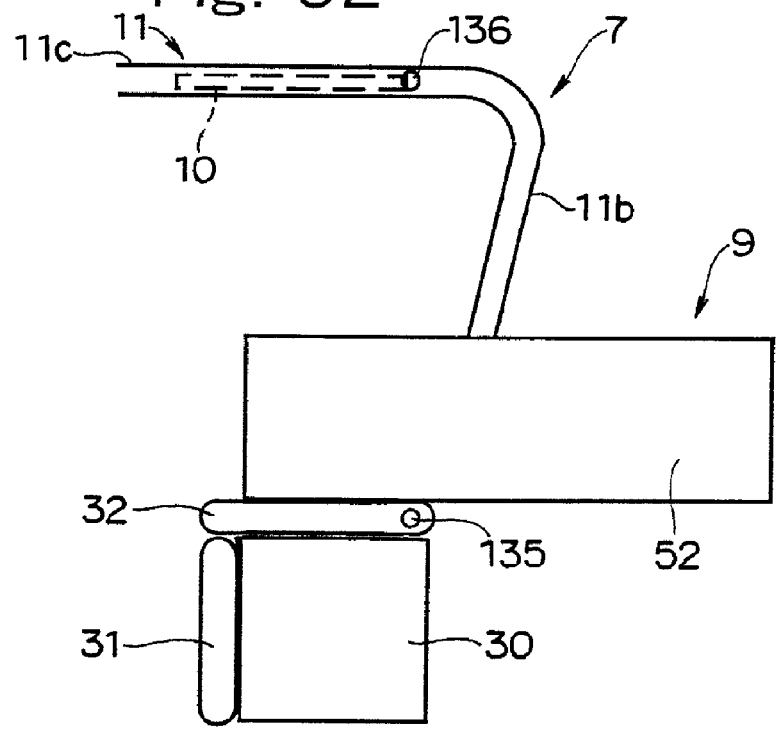
FIG. 32 is a left side view of the pick-up style utility vehicle of FIG. 31 in 2 passengers transformation.

FIGS. 31 and 32 show a fourteenth embodiment of the present invention. FIG. 31 is a left side view of the 4 passengers transformation when the cargo bed 9 is not expanded. FIG. 32 is a left side view of the 2 passengers transformation when the cargo bed 9 is expanded forward. The same components as those of the first embodiment are indicated by the same reference numerals.

In FIG. 31, the seat bottom 31 of the rear seat 22 is detachably fixed to the upper surface of the box 30 by a bolt or the like, and the backrest 32 is rotatably supported at the rear end of the upper surface of the box 30 via a hinge 135. Therefore, the backrest 32 is position changeable between an erected position, as shown in FIG. 31 and a position in which it is fallen to the upper surface of the box 30, as shown in FIG. 32.

The screen shield 10 is rotatably supported by the upper side portion 11c of the cabin frame 7 via a hinge 136 and is position changeable between a hang-down position, as shown in FIG. 31 and a substantially horizontal retracted position, as shown in FIG. 32.

In the 4 passengers transformation of FIG. 31, the upper end of the backrest 32 in the erected position and the lower end of the screen shield 10 in the hang-down position are coupled by an appropriate coupling member. In addition, the side panels 52 of the cargo bed 9 are extended to the left and right sides in the rear riding space of the rear seat 22.

When the 4 passengers transformation of FIG. 31 is changed to the 2 passengers transformation of FIG. 32, the seat bottom 31 is detached from the box 30 and is retracted in front of the box 30. The coupling of the screen shield 10 and the backrest 32 is released. The screen shield 10 is rotated upward and is fixed to the upper side portion 11c of the cabin frame 7 in a substantially horizontal state. The backrest 32 is fallen on the upper surface of the box 30 and is used as an expandable bottom plate for the forward expandable portion of the cargo bed 9.

As a modification of the fourteenth embodiment, the backrest 32 may be divided to the left and right and be opened to the left and right in a hinged double door form. In the case, the backrests 32 can be used as the expandable side panel. In addition, as in the first embodiment, the side panel 52 of the cargo bed 9 may be extendable forward.

Fifteenth Embodiment

Figure 33:
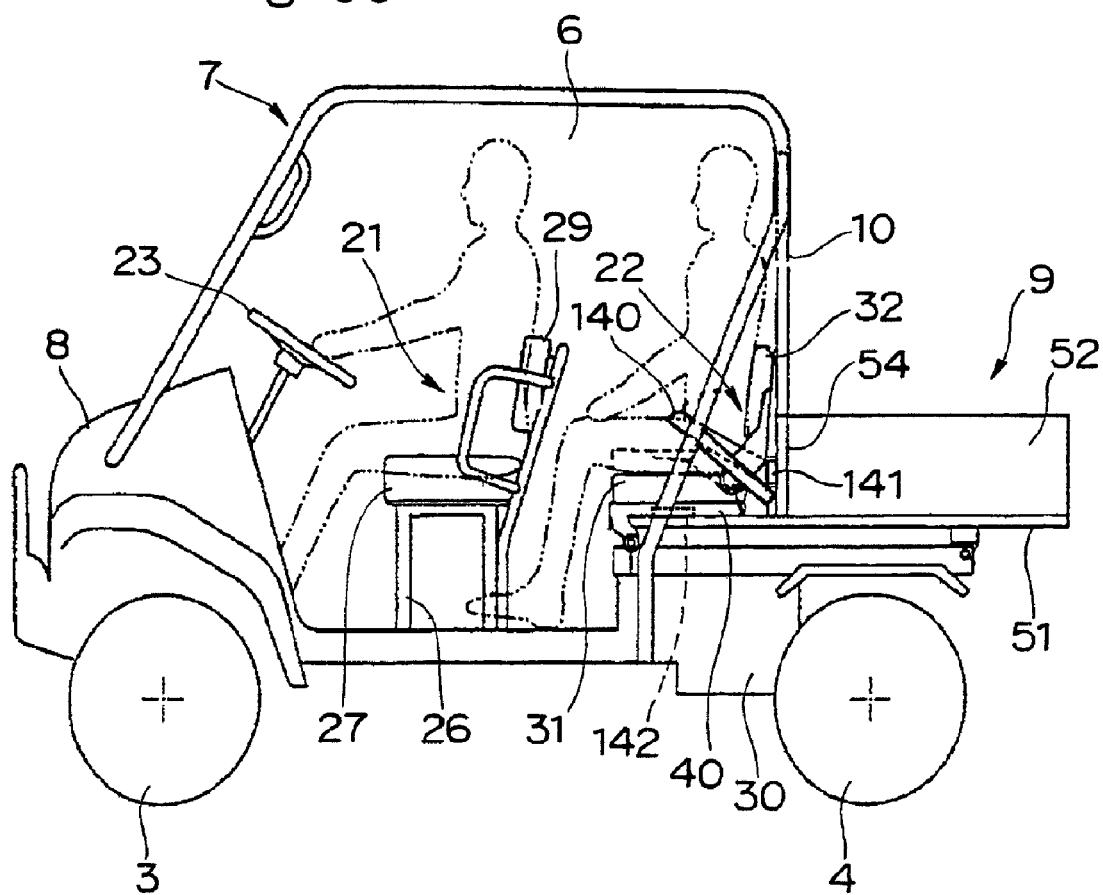
FIG. 33 is a left side view of a pick-up style utility vehicle according to a fifteenth embodiment of the present invention in the 4 passengers transformation.
Figure 34:
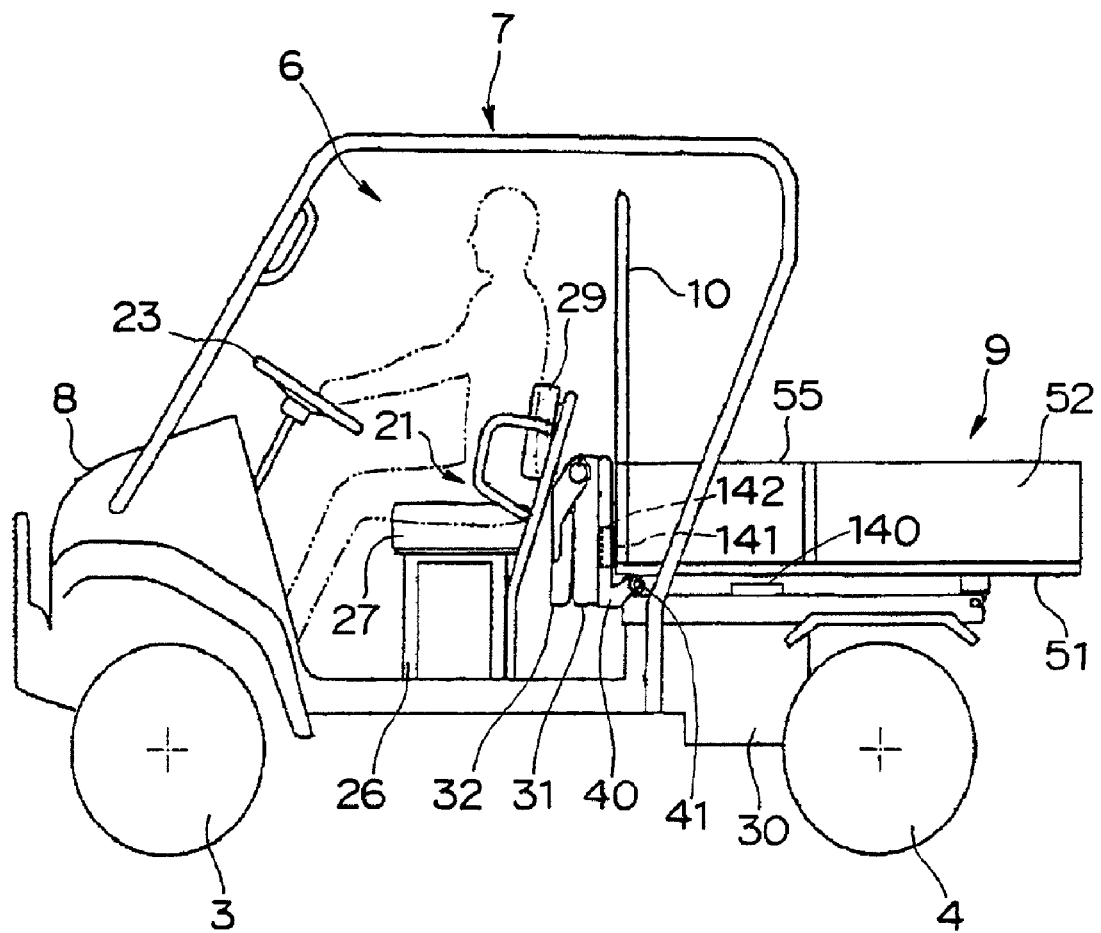
FIG. 34 is a left side view of the pick-up style utility vehicle of FIG. 33 in the 2 passengers transformation.
Figure 35:
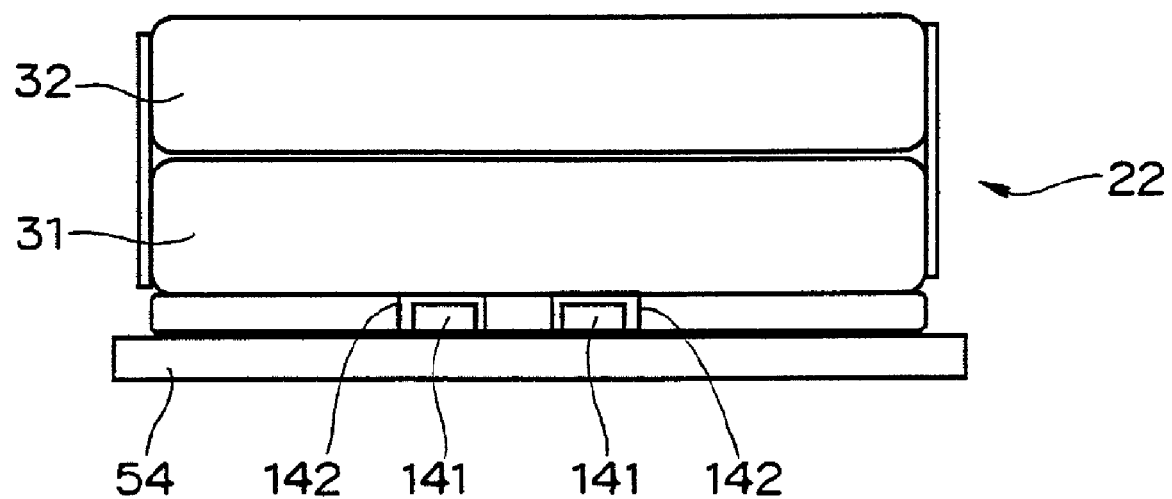
FIG. 35 is an enlarged view of a folded rear seat of FIG. 34.
Figure 36:
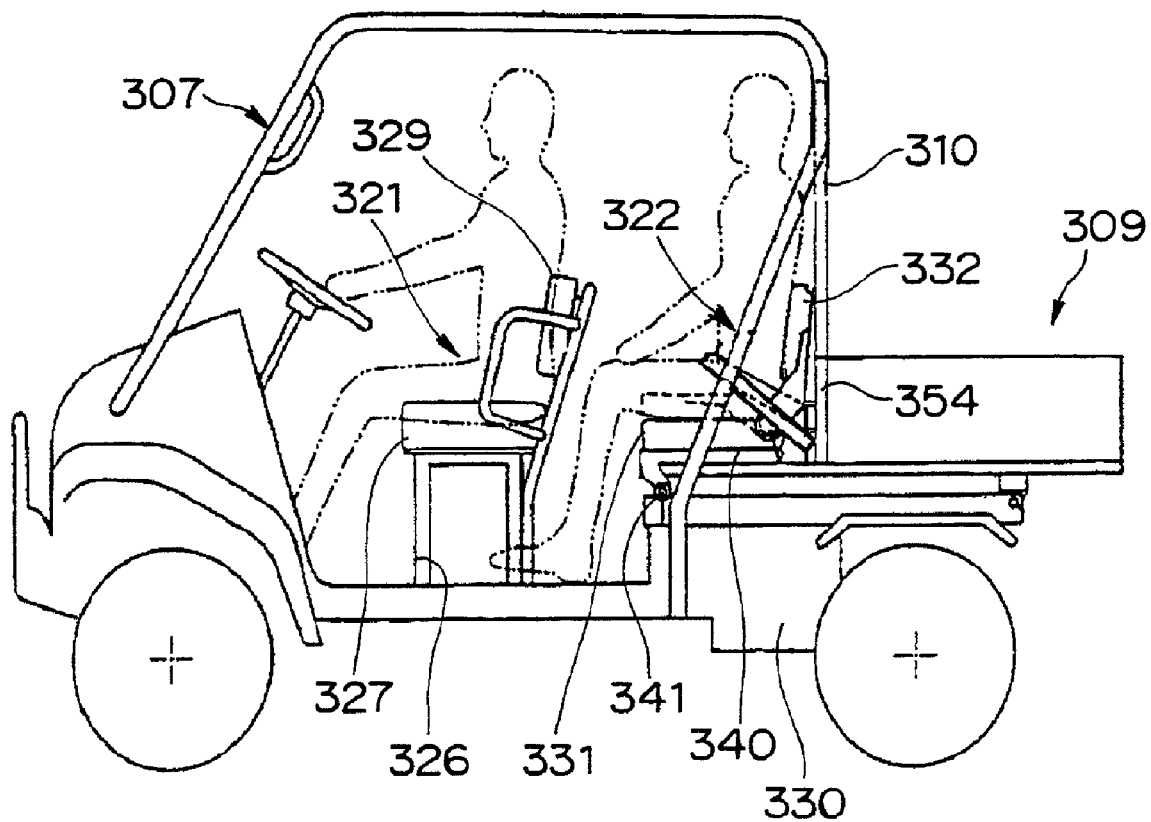
FIG. 36 is a left side view of a prior art pick-up style utility vehicle in the 4 passengers transformation.

FIGS. 33 to 35 show a fifteenth embodiment of the present invention. FIG. 33 is a left side view of the 4 passengers transformation when the cargo bed 9 is not expanded. FIG. 34 is a left side view of the 2 passengers transformation when the cargo bed 9 is expanded forward. FIG. 35 is a plan enlarged view of the rear seat 22 of FIG. 34.

Figure 37:
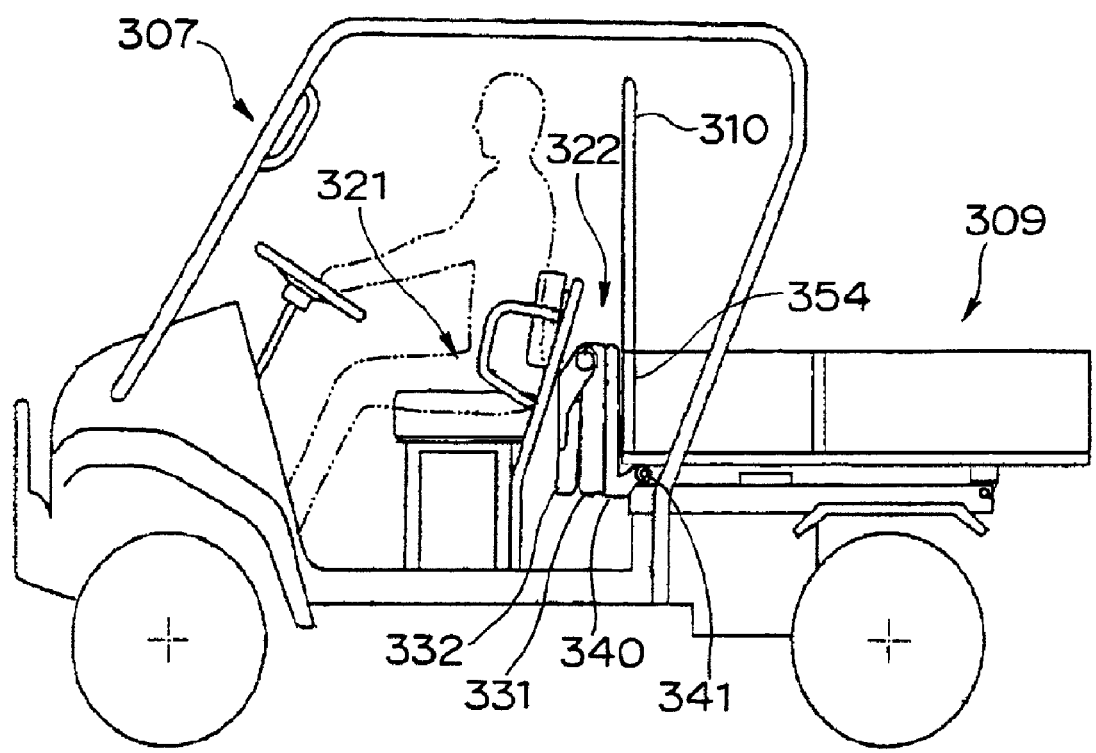
FIG. 37 is a left side view of the pick-up style utility vehicle of FIG. 36 in the 2 passengers transformation.

In the fifteenth embodiment, as shown in FIG. 34, in the 2 passengers transformation, the seat bottom 31 and the backrest 32 of the rear seat 22 are folded and are retracted in front of the front panel 54 of the cargo bed 9 in the expanded state (as in the prior art of FIG. 37). The housing of a metal member 141 of a seatbelt 140 is devised.

In FIG. 33, the vehicle has a seatbelt (not shown) for the front seat 21, and the seatbelt 140 for the rear seat 22. To fasten each of the left and right passengers, one end of each of the left and right seatbelts 140 for the rear seat is fixed to each of the left and right ends of the rear seat 22 and the pair of metal members 141 to which the coupling metal members of the left and right seatbelts 140 and 140 are coupled are provided in the center portion of the width of the rear seat 22 in a left-right direction, as shown in FIG. 35.

In this embodiment, in the 2 passengers transformation, concave portions 142, which can house the metal members 141, are formed in the back surface (lower surface) of the seat bottom 31 so as to expand the cargo bed 9 forward to a maximum without the obstruction of the metal members 141.

According to the embodiment, even if the seat bottom 31 and the backrest 32 of the rear seat 22 are folded and retracted in front of the cargo bed 9, the forward expanded area of the cargo bed 9 can be increased.

Other Embodiments

The present invention is not limited to the configurations of the above embodiments and includes various modified examples contemplated in the scope of the invention without departing from the contents described in the scope of claims.

What is claimed is:

1. A pick-up style utility vehicle comprising:
a front seat;
a rear seat; and
a cargo bed; wherein:
the cargo bed is expandable forward and has a screen shield for partitioning at a front end thereof;
the rear seat is attached to a seat attaching plate;
the seat attaching plate is rotatably supported by a vehicle body between a fallen position and an erected position about a rotational shaft in a vehicle width direction and has a pair of toggle clamps positioned so as to be spaced in a vehicle width direction;
each of the toggle clamps has a clamp lever rotatably provided on the seat attaching plate, and a wire ring coupled to the clamp lever;
the bottom surface of the seat bottom has at least two hook portion rows each of which has a plurality of hook portions arranged so as to be spaced in a front-rear direction and the at least two hook portion rows are spaced in a vehicle width direction; and
the wire ring of each of the toggle clamps selectively engages the hook portions of one of the hook portion rows so that, upon rotation of the clamp levers, the seat bottom is fixed to the seat attaching plate and thereby the position of the seat bottom relative to the seat attaching plate is changeable forward and rearward.

* * * * *